US012221769B2

(12) United States Patent
Chiba et al.

(10) Patent No.: US 12,221,769 B2
(45) Date of Patent: Feb. 11, 2025

(54) WORK MACHINE

(71) Applicant: Hitachi Construction Machinery Co., Ltd., Tokyo (JP)

(72) Inventors: Takaaki Chiba, Tsuchiura (JP); Kento Kumagai, Tsuchiura (JP); Yusuke Imai, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 805 days.

(21) Appl. No.: 17/436,174

(22) PCT Filed: Aug. 7, 2020

(86) PCT No.: PCT/JP2020/030335

§ 371 (c)(1),
(2) Date: Sep. 3, 2021

(87) PCT Pub. No.: WO2021/059775

PCT Pub. Date: Apr. 1, 2021

(65) Prior Publication Data

US 2022/0127823 A1 Apr. 28, 2022

(30) Foreign Application Priority Data

Sep. 25, 2019 (JP) ................................ 2019-174623

(51) Int. Cl.
*E02F 9/22* (2006.01)
*F15B 11/08* (2006.01)
*F15B 11/16* (2006.01)

(52) U.S. Cl.
CPC .......... *E02F 9/2285* (2013.01); *E02F 9/2228* (2013.01); *E02F 9/2235* (2013.01);
(Continued)

(58) Field of Classification Search
CPC . F15B 11/165; F15B 11/166; F15B 2211/355; F15B 2211/635; F15B 2211/67; E02F 9/2228; E02F 9/2235; E02F 9/2285
See application file for complete search history.

(56) References Cited

U.S. PATENT DOCUMENTS 5,056,312 A * 10/1991 Hirata .................. E02F 9/2292 91/518
6,241,482 B1 6/2001 Iga
(Continued)

FOREIGN PATENT DOCUMENTS

EP 0 898 084 A1 2/1999
JP 2-93102 A 4/1990
(Continued)

OTHER PUBLICATIONS

Extended European Search Report issued in European Application No. 20867045.5 dated Sep. 29, 2022 (eight (8) pages).
(Continued)

*Primary Examiner* — Michael Leslie
(74) *Attorney, Agent, or Firm* — Crowell & Moring LLP

(57) ABSTRACT

A hydraulic excavator 1 includes an engine 16, a main hydraulic pump 17 driven by the engine 16, a plurality of hydraulic actuators driven with pressure oil discharged from the main hydraulic pump 17, a plurality of flow rate control valves adapted to control the flow rate of pressure oil to be supplied from the main hydraulic pump 17 to the respective hydraulic actuators, a pilot hydraulic pump 18 adapted to supply pressure oil for driving the flow rate control valves, and a controller 15 configured to control the discharge flow rate of the pilot hydraulic pump 18. The controller 15 controls the discharge flow rate of the pilot hydraulic pump 18 such that it becomes equal to the sum of requested pilot flow rates determined in accordance with control commands
(Continued)

for the respective flow rate control valves and a preset standby flow rate.

3 Claims, 17 Drawing Sheets

(52) U.S. Cl.
CPC .......... *E02F 9/2267* (2013.01); *E02F 9/2296* (2013.01); *F15B 11/08* (2013.01); *F15B 11/166* (2013.01); *F15B 2211/20553* (2013.01); *F15B 2211/355* (2013.01); *F15B 2211/523* (2013.01); *F15B 2211/575* (2013.01); *F15B 2211/6346* (2013.01); *F15B 2211/635* (2013.01); *F15B 2211/67* (2013.01)

(56) References Cited

U.S. PATENT DOCUMENTS

| | | | | |
|---|---|---|---|---|
| 6,308,516 | B1 * | 10/2001 | Kamada | F15B 11/167<br>60/452 |
| 6,393,838 | B1 * | 5/2002 | Moriya | E02F 9/2239<br>60/426 |
| 6,498,973 | B2 * | 12/2002 | Dix | E02F 9/2228<br>701/50 |
| 7,434,393 | B2 * | 10/2008 | Hesse | F15B 11/163<br>60/484 |
| 8,429,909 | B2 * | 4/2013 | Heemskerk | F15B 21/087<br>60/463 |
| 9,340,955 | B2 * | 5/2016 | Shimazu | E02F 9/2207 |
| 11,434,936 | B2 * | 9/2022 | Ziemens | F15B 11/163 |
| 2006/0147315 | A1 | 7/2006 | Jang et al. | |
| 2013/0160439 | A1 | 6/2013 | Lee et al. | |
| 2020/0011030 | A1 | 1/2020 | Nakano et al. | |
| 2020/0032485 | A1 | 1/2020 | Hijikata et al. | |

FOREIGN PATENT DOCUMENTS

| | | | |
|---|---|---|---|
| JP | 4-290603 | A | 10/1992 |
| JP | 10-231805 | A | 9/1998 |
| JP | 4601635 | B2 | 12/2010 |
| JP | 2013-543086 | A | 11/2013 |
| JP | 2017-61795 | A | 3/2017 |
| JP | 2018-128066 | A | 8/2018 |
| JP | 2019-39208 | A | 3/2019 |
| JP | 2019-44933 | A | 3/2019 |
| KR | 2001-0033699 | A | 4/2001 |
| WO | WO 2019/049435 | A1 | 3/2019 |

OTHER PUBLICATIONS

Japanese-language Office Action issued in Japanese Application No. 2019-174623 dated Nov. 8, 2022 (four (4) pages).
International Search Report (PCT/ISA/210) issued in PCT Application No. PCT/JP2020/030335 dated Oct. 20, 2020 with English translation (five (5) pages).
Japanese-language Written Opinion (PCT/ISA/237) issued in PCT Application No. PCT/JP2020/030335 dated Oct. 20, 2020 (four (4) pages).
Korean-language Office Action issued in Korean Application No. 10-2021-7028422 dated Jan. 19, 2023 (five (5) pages.

* cited by examiner

WORK MACHINE

TECHNICAL FIELD

The present invention relates to a work machine.

The present application claims priority from Japanese Patent Application No. 2019-174623 filed on Sep. 25, 2019, the entire content of which is hereby incorporated by reference into this application.

BACKGROUND ART

As a work machine, a hydraulic excavator is widely known that includes a main hydraulic pump adapted to supply pressure oil for driving hydraulic actuators, flow rate control valves adapted to control the flow rate of pressure oil to be supplied to the respective hydraulic actuators, and a pilot hydraulic pump adapted to supply pressure oil for driving the flow rate control valves. In such a work machine, it is common that the main hydraulic pump and the pilot hydraulic pump are driven by a single engine (i.e., a prime mover), and the pilot hydraulic pump is a fixed displacement hydraulic pump. There has been a problem in that even when the hydraulic actuators are not driven, the pilot hydraulic pump supplies pressure oil in accordance with the number of revolutions of the engine, resulting in wasteful energy consumption.

To solve such a problem, a variety of techniques have been proposed. For example, Patent Literature 1 discloses a work machine in which an electric motor for driving a pilot hydraulic pump is provided separately from a prime mover for driving a main hydraulic pump, and start and stop of the electric motor, which is directly coupled to the pilot hydraulic pump, are controlled in accordance with actuating signals for hydraulic actuators. According to such a work machine, when there is no actuating signal for the hydraulic actuators, the electric motor stops. Thus, wasteful energy consumption of the pilot hydraulic pump can be suppressed.

In addition, Patent Literature 2 discloses a work machine including a pressure-compensating variable-displacement pilot hydraulic pump. According to such a work machine, the discharge flow rate of the pilot hydraulic pump is controlled in accordance with the discharge pressure of the pilot hydraulic pump so that the torque consumption of the pilot hydraulic pump becomes constant. Thus, it is possible to reduce energy consumption when hydraulic actuators are not operated, that is, when the discharge flow rate of the pilot hydraulic pump is not needed.

CITATION LIST

Patent Literature

Patent Literature 1: JP 4601635 B
Patent Literature 2: JP 2017-061795 A

SUMMARY OF INVENTION

Technical Problem

However, the aforementioned work machines have the following problems. That is, in the work machine of Patent Literature 1, the electric motor directly coupled to the pilot hydraulic pump is started after actuating signals for the hydraulic actuators are input. Thus, the discharge pressure of the pilot hydraulic pump will not increase until the number of revolutions of the electric motor has increased. This may result in decreased responsiveness of the hydraulic actuators and lost operability. In addition, since the electric motor performs only the start and stop operations in accordance with actuating signals, the pilot hydraulic pump will supply an excess discharge flow rate when the hydraulic actuators are operated, which results in wasted energy consumption.

In addition, regarding the pressure-compensating variable-displacement pilot hydraulic pump in the work machine of Patent Literature 2, flow rate control valves are driven through operation of the hydraulic actuators, and the supply flow rate of the pilot hydraulic pump will increase after the discharge pressure of the pilot hydraulic pump has decreased. Thus, the operation of the hydraulic actuators may temporarily become slow or stop depending on the responsiveness of the variable-displacement pilot hydraulic pump, which in turn may degrade operability.

In view of the foregoing circumstances, it is an object of the present invention to provide a work machine in which energy consumed by a pilot hydraulic pump can be reduced and excellent operability can be maintained.

Solution to Problem

A work machine according to the present invention is a work machine including a prime mover; at least one main hydraulic pump driven by the prime mover; a plurality of hydraulic actuators driven with pressure oil discharged from the main hydraulic pump; a plurality of flow rate control valves adapted to control the flow rate of pressure oil to be supplied from the main hydraulic pump to the respective hydraulic actuators; a pilot hydraulic pump adapted to supply pressure oil for driving the flow rate control valves; and a controller configured to control the discharge flow rate of the pilot hydraulic pump, in which the controller is configured to control the discharge flow rate of the pilot hydraulic pump such that the discharge flow rate becomes equal to the sum of requested pilot flow rates determined in accordance with control commands for the respective flow rate control valves and a preset standby flow rate.

With the work machine according to the present invention, it is possible to reduce the energy consumption of the pilot hydraulic pump. In addition, since the pilot hydraulic pump supplies a pilot flow rate that is higher than the pilot flow rate necessary for driving the hydraulic actuators by the standby flow rate, it is possible to prevent response delay of the hydraulic actuators as well as temporal deceleration or stop of the hydraulic actuators, which would otherwise occur due to an insufficient supply of the pilot flow rate, and thus maintain excellent operability.

Advantageous Effects of Invention

According to the present invention, energy consumed by the pilot hydraulic pump can be reduced and excellent operability can be maintained.

DESCRIPTION OF EMBODIMENTS

Hereinafter, embodiments of a work machine according to the present invention will be described with reference to the drawings. In the description of the drawings, identical elements are denoted by identical reference signs, and repeated description thereof will be omitted. Although the following description illustrates an example in which the work machine is a hydraulic excavator, the present invention is not limited thereto, and is also applicable to work machines other than hydraulic excavators. Further, in the following description, the directions and positions indicated by upper, lower, right, left, front, or rear are based on the state in which the hydraulic excavator is used in the ordinary way, that is, a traveling body touches the ground.

First Embodiment

Figure 1:
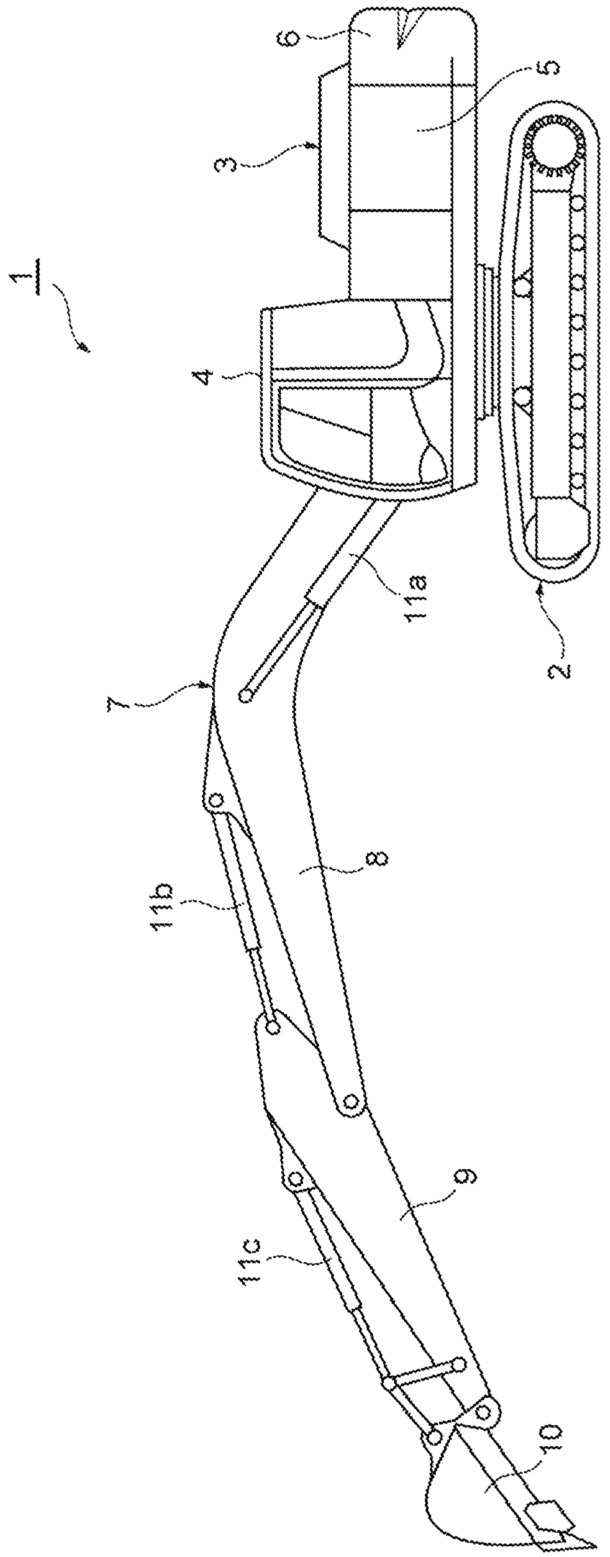
FIG. 1 is a side view illustrating a hydraulic excavator according to a first embodiment.

FIG. 1 is a side view illustrating a hydraulic excavator according to a first embodiment. A hydraulic excavator 1 according to the present embodiment includes a traveling body 2 that travels with crawler belts provided on its right and left side portions driven, and a swivel body 3 provided above the traveling body 2 in a swivellable manner. The swivel body 3 includes an operator's cab 4, an engine room 5, a counterweight 6, and a work implement 7. The operator's cab 4 is provided in the left side portion of the swivel body 3. The engine room 5 is provided behind the operator's cab 4. The counterweight 6 is provided behind the engine room 5, that is, in the rearmost portion of the swivel body 3.

The work implement 7 includes a boom 8, an arm 9, a bucket 10, a boom cylinder 11*a* for driving the boom 8, an arm cylinder 11*b* for driving the arm 9, and a bucket cylinder 11*c* for driving the bucket 10. The proximal end of the boom 8 is rotatably attached to the front portion of the swivel body 3 via a boom pin. The proximal end of the arm 9 is rotatably attached to the distal end of the boom 8 via an arm pin. The proximal end of the bucket 10 is rotatably attached to the distal end of the arm 9 via a bucket pin.

Each of the boom cylinder 11*a*, the arm cylinder 11*b*, and the bucket cylinder 11*c* is a hydraulic actuator driven with pressure oil. Thus, in the following description, the boom cylinder 11*a* is referred to as a "hydraulic actuator 11*a*," the arm cylinder 11*b* is referred to as a "hydraulic actuator 11*b*," and the bucket cylinder 11*c* is referred to as a "hydraulic actuator 11*c*."

Figure 4:
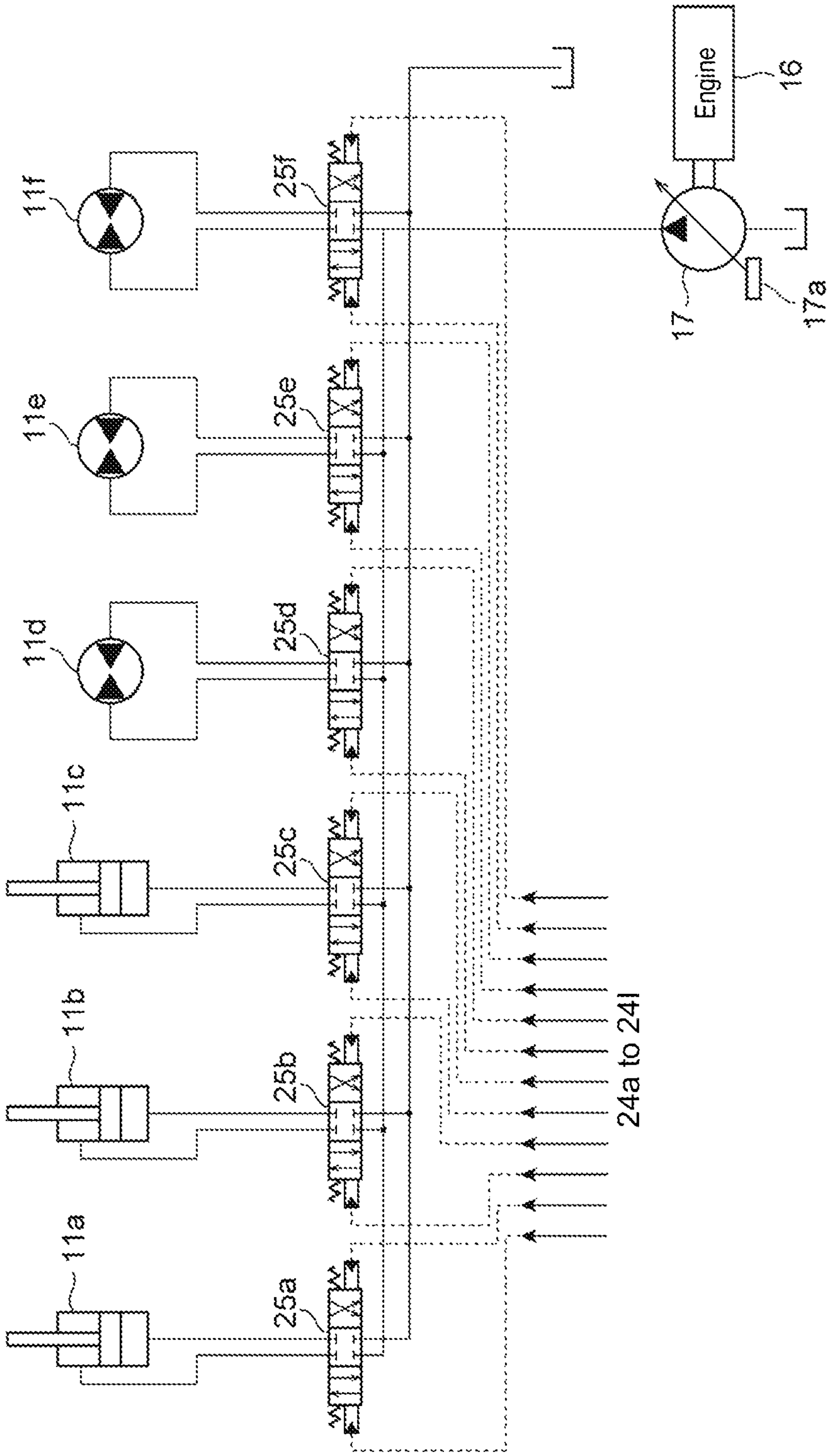
FIG. 4 is a diagram for illustrating a hydraulic circuit of hydraulic actuators and flow rate control valves.

The swivel body 3 has a swivel motor 11*d* disposed in its center (see FIG. 4). When the swivel motor 11*d* is driven, the swivel body 3 rotates with respect to the traveling body 2. In addition, the traveling body 2 has a right travel motor 11*e* and a left travel motor 11*f* disposed therein (see FIG. 4). When the travel motors are driven, the right and left crawler belts are driven. Accordingly, the traveling body 2 can move forward or backward. Each of the swivel motor 11*d*, the right travel motor 11*e*, and the left travel motor 11*f* is a hydraulic actuator that is driven with pressure oil. Thus, in the following description, the swivel motor 11*d* is referred to as a "hydraulic actuator 11*d*," the right travel motor 11*e* is referred to as a "hydraulic actuator 11*e*," and the left travel motor 11*f* is referred to as a "hydraulic actuator 11*f*."

Figure 2:
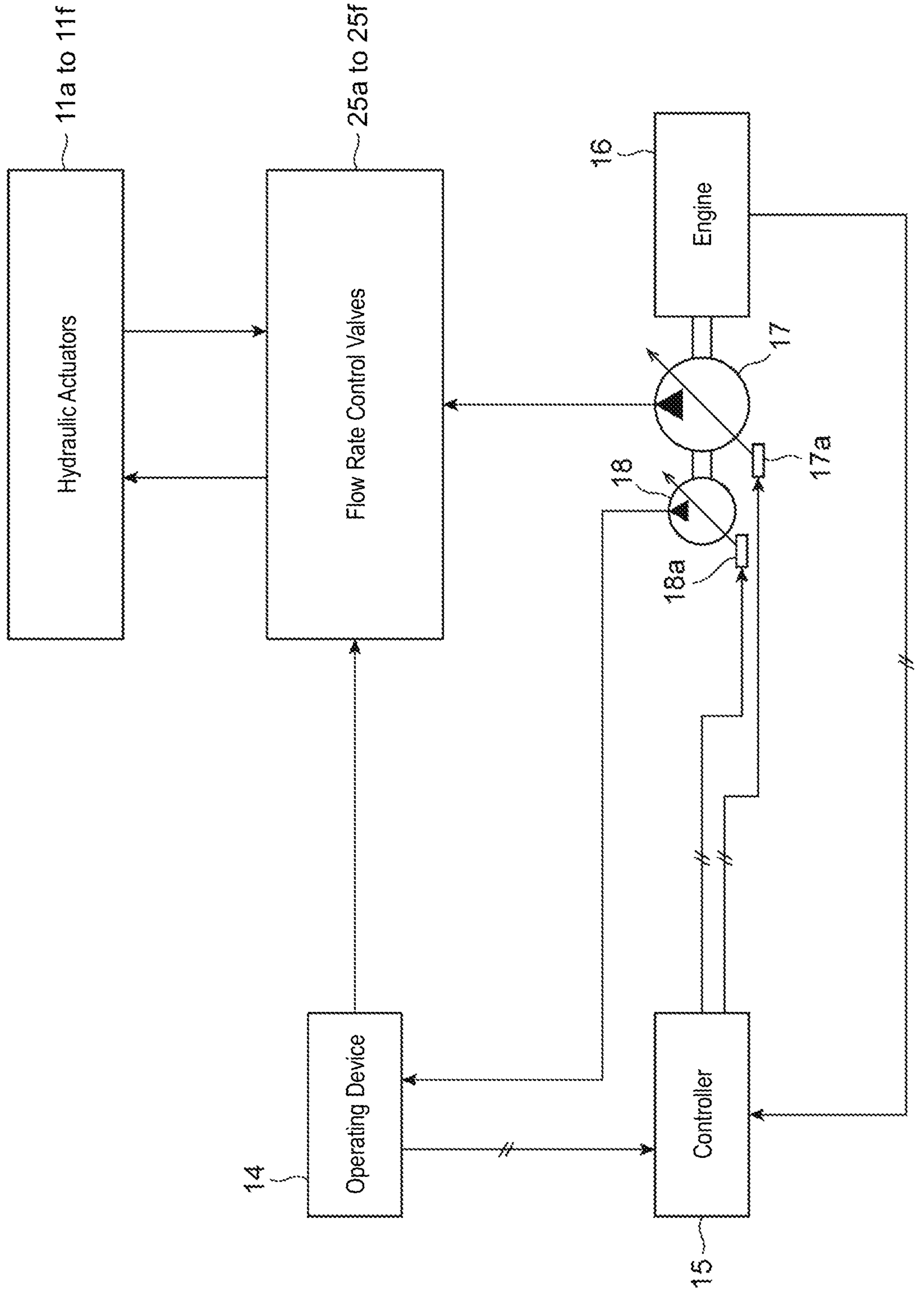
FIG. 2 is a configuration diagram illustrating a system of the hydraulic excavator according to the first embodiment.

The engine room 5 has disposed therein an engine 16, a main hydraulic pump 17, and a pilot hydraulic pump 18 (see FIG. 2). Each of the main hydraulic pump 17 and the pilot hydraulic pump 18 is driven by the engine (i.e., a prime mover) 16. It should be noted that each of the main hydraulic pump 17 and the pilot hydraulic pump 18 may also be driven by an electric motor (i.e., a prime mover).

FIG. 2 is a configuration diagram illustrating a system of the hydraulic excavator according to the first embodiment. As illustrated in FIG. 2, the hydraulic actuators 11*a* to 11*f* are driven with pressure oil that has been discharged from the main hydraulic pump 17 and further supplied through flow rate control valves 25*a* to 25*f*, respectively. The flow rate control valves 25*a* to 25*f* are adapted to control the flow rate of pressure oil to be supplied from the main hydraulic pump 17 to the hydraulic actuators 11*a* to 11*f*, respectively, and are driven with control pilot pressures output from an operating device 14.

The main hydraulic pump 17 and the pilot hydraulic pump 18 are variable-displacement hydraulic pumps driven by the engine 16. The displacement (i.e., pump tilt) of each of the main hydraulic pump 17 and the pilot hydraulic pump 18 is controlled based on a control command from a controller 15. More specifically, a control signal from the controller 15 is sent to a regulator 17*a*, and then, the regulator 17*a* controls the tilt of the main hydraulic pump 17, thereby adjusting the discharge flow rate of the main hydraulic pump 17. Similarly, a control signal from the controller 15 is sent to a regulator 18*a*, and then, the regulator 18*a* controls the tilt of the pilot hydraulic pump 18, thereby adjusting the discharge flow rate of the pilot hydraulic pump 18. The main hydraulic pump 17 supplies pressure oil to the flow rate control valves 25*a* to 25*f*, and the pilot hydraulic pump 18 supplies pilot pressure oil to the operating device 14.

The operating device 14 includes hydraulic pilot levers that are adapted to reduce the pressure of pilot pressure oil supplied from the pilot hydraulic pump 18 in accordance with the operation amounts of the pilot levers, and then output control pilot pressures to the flow rate control valves 25*a* to 25*f*, respectively. Each hydraulic pilot lever has attached thereto an operation amount detection device, which will be described in detail later. The operation amount detection device detects the operation amount of the operating device 14, and outputs the detection result to the controller 15.

The controller 15 computes a control command for each of the flow rate control valves 25*a* to 25*f* from each operation amount output from the operating device 14 based on the detection result of each operation amount detection device, and computes the control amount for each of the main hydraulic pump 17 and the pilot hydraulic pump 18 based on the control command for each of the flow rate control valves 25*a* to 25*f* and the number of revolutions of the engine 16 output from the engine, and then outputs the computed control amount.

Figure 3:
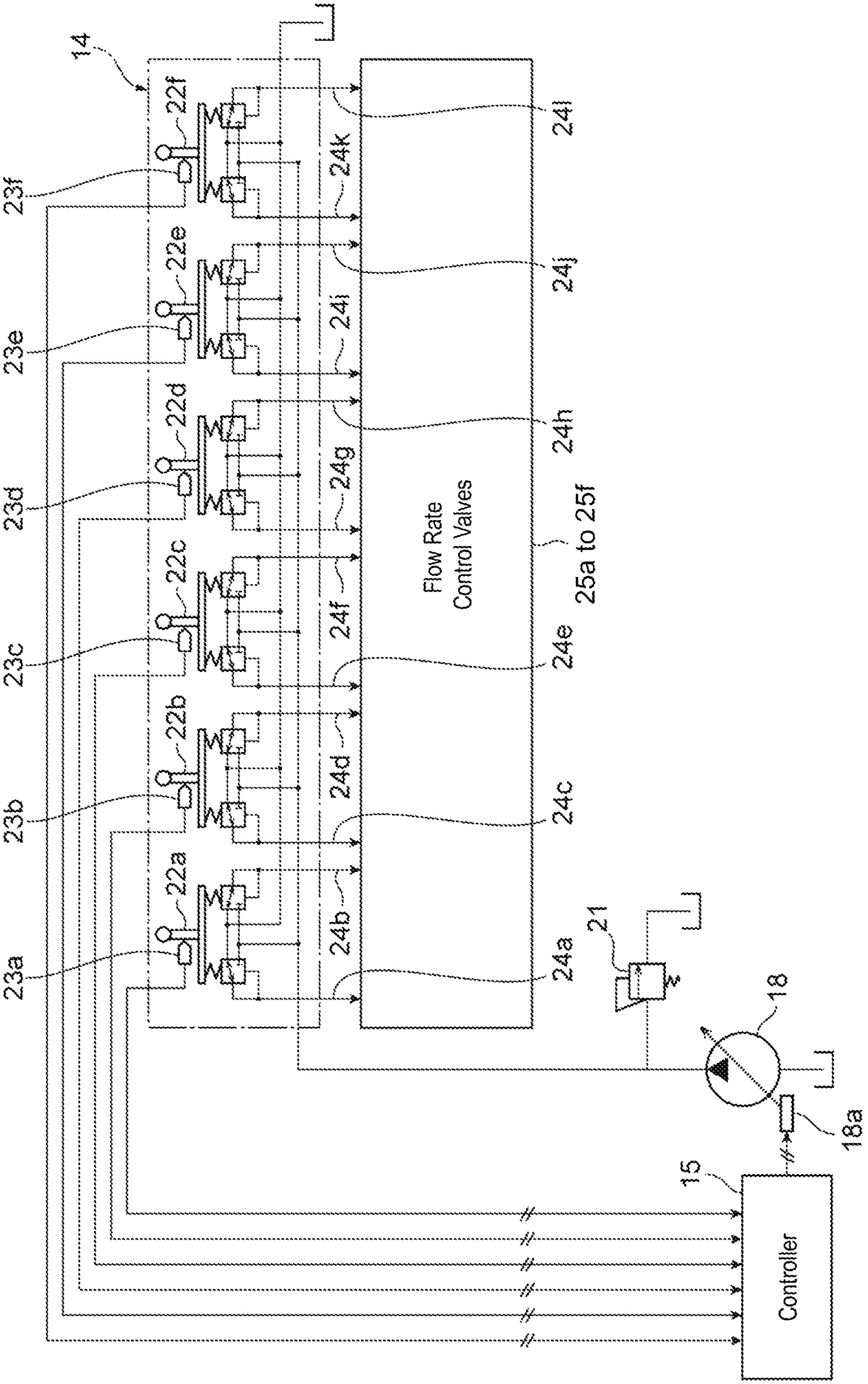
FIG. 3 is a diagram illustrating a hydraulic circuit of the hydraulic excavator according to the first embodiment.

FIG. 3 is a diagram illustrating a hydraulic circuit of the hydraulic excavator according to the first embodiment. As illustrated in FIG. 3, the operating device 14 includes a boom operating lever 22*a*, an arm operating lever 22*b*, a bucket operating lever 22*c*, a swivel operating lever 22*d*, a right-travel operating lever 22*e*, and a left-travel operating lever 22*f*. The boom operating lever 22*a* has attached thereto a boom operation amount detection device 23*a* for detecting its operation amount. The arm operating lever 22*b* has attached thereto an arm operation amount detection device 23*b* for detecting its operation amount. The bucket operating lever 22*c* has attached thereto a bucket operation amount detection device 23*c* for detecting its operation amount. The swivel operating lever 22*d* has attached thereto a swivel operation amount detection device 23*d* for detecting its operation amount. The right-travel operating lever 22*e* has attached thereto a right-travel operation amount detection device 23*e* for detecting its operation amount. The left-travel operating lever 22*f* has attached thereto a left-travel operation amount detection device 23*f* for detecting its operation amount. Each of the operation amount detection devices 23*a* to 23*f* outputs its detection result to the controller 15. It should be noted that each of the operation amount detection devices 23*a* to 23*f* may be a device, such as a potentiometer or a stroke sensor, that electrically measures the driven amount of each of the operating levers 22*a* to 22*f*, and may also be a pressure sensor that detects a control pilot pressure generated as a result of operating each of the operating levers 22*a* to 22*f*.

Though not illustrated, each of the operating levers 22*a* to 22*f* is provided with a pilot valve. The pilot valve is adapted to reduce the pressure of pilot pressure oil supplied from the pilot hydraulic pump 18 in accordance with the operation direction and the operation amount of each of the operating levers 22*a* to 22*f*, and output a control pilot pressure to each of the flow rate control valves 25*a* to 25*f*.

More specifically, the boom operating lever 22*a* outputs a boom lowering control pilot pressure 24*a* and a boom raising control pilot pressure 24*b*, the arm operating lever 22*b* outputs an arm dump control pilot pressure 24*c* and an arm crowd control pilot pressure 24*d*, the bucket operating lever 22*c* outputs a bucket dump control pilot pressure 24*e* and a bucket crowd control pilot pressure 24*f*, the swivel operating lever 22*d* outputs a right-swivel control pilot pressure 24*g* and a left-swivel control pilot pressure 24*h*, the right-travel operating lever 22*e* outputs a right-travel forward movement control pilot pressure 24*i* and a right-travel backward movement control pilot pressure 24*j*, and the left-travel operating lever 22*f* outputs a left-travel forward movement control pilot pressure 24*k* and a left-travel backward movement control pilot pressure 24*l*.

In addition, a relief valve 21 is provided in the discharge oil passage of the pilot hydraulic pump 18. The relief valve 21 is adapted to prevent the pressure of pilot pressure oil from increasing to greater than or equal to a preset pressure of the relief valve 21.

FIG. 4 is a diagram for illustrating a hydraulic circuit of the hydraulic actuators and the flow rate control valves. As described above, the hydraulic actuators 11*a* to 11*f* are driven with pressure oil that has been discharged from the main hydraulic pump 17 and further supplied through the flow rate control valves 25*a* to 25*f*, respectively. Among the flow rate control valves 25*a* to 25*f*, the flow rate control valve 25*a* is a boom flow rate control valve, the flow rate control valve 25*b* is an arm flow rate control valve, the flow rate control valve 25*c* is a bucket flow rate control valve, the flow rate control valve 25*d* is a swivel flow rate control valve, the flow rate control valve 25*e* is a right-travel flow rate control valve, and the flow rate control valve 25*f* is a left-travel flow rate control valve.

That is, the boom flow rate control valve 25*a* controls the flow rate of pressure oil to be supplied to the hydraulic actuator (i.e., the boom cylinder) 11*a*, the arm flow rate control valve 25*b* controls the flow rate of pressure oil to be supplied to the hydraulic actuator (i.e., the arm cylinder) 11*b*, the bucket flow rate control valve 25*c* controls the flow rate of pressure oil to be supplied to the hydraulic actuator (i.e., the bucket cylinder) 11*c*, the swivel flow rate control valve 25*d* controls the flow rate of pressure oil to be supplied to the hydraulic actuator (i.e., the swivel motor) 11*d*, the right-travel flow rate control valve 25*e* controls the flow rate of pressure oil to be supplied to the hydraulic actuator (i.e., the right-travel motor) 11*e*, and the left-travel flow rate control valve 25*f* controls the flow rate of pressure oil to be supplied to the hydraulic actuator (i.e., the left travel motor) 11*f*.

For example, the boom flow rate control valve 25*a* is driven with the boom lowering control pilot pressure 24*a* or the boom raising control pilot pressure 24*b* output from the operating device 14. For example, when the boom lowering control pilot pressure 24*a* acts on the boom flow rate control valve 25*a*, the boom flow rate control valve 25*a* is driven to the right in FIG. 4. This allows the pressure oil supplied from the main hydraulic pump 17 to be supplied to the rod chamber side of the boom cylinder 11*a* and allows oil on the bottom chamber side of the boom cylinder 11*a* to be discharged to a tank. Consequently, the boom cylinder 11*a* operates in the retracting direction, and the boom 8 operates in the downward direction.

Meanwhile, when the boom raising control pilot pressure 24*b* acts on the boom flow rate control valve 25*a*, the boom flow rate control valve 25*a* is driven to the left in FIG. 4. This allows the pressure oil supplied from the main hydraulic pump 17 to be supplied to the bottom chamber side of the boom cylinder 11*a*, and allows oil on the rod chamber side of the boom cylinder 11*a* to be discharged to the tank. Accordingly, the boom cylinder 11*a* operates in the extending direction, and the boom 8 operates in the upward direction.

Figure 5:
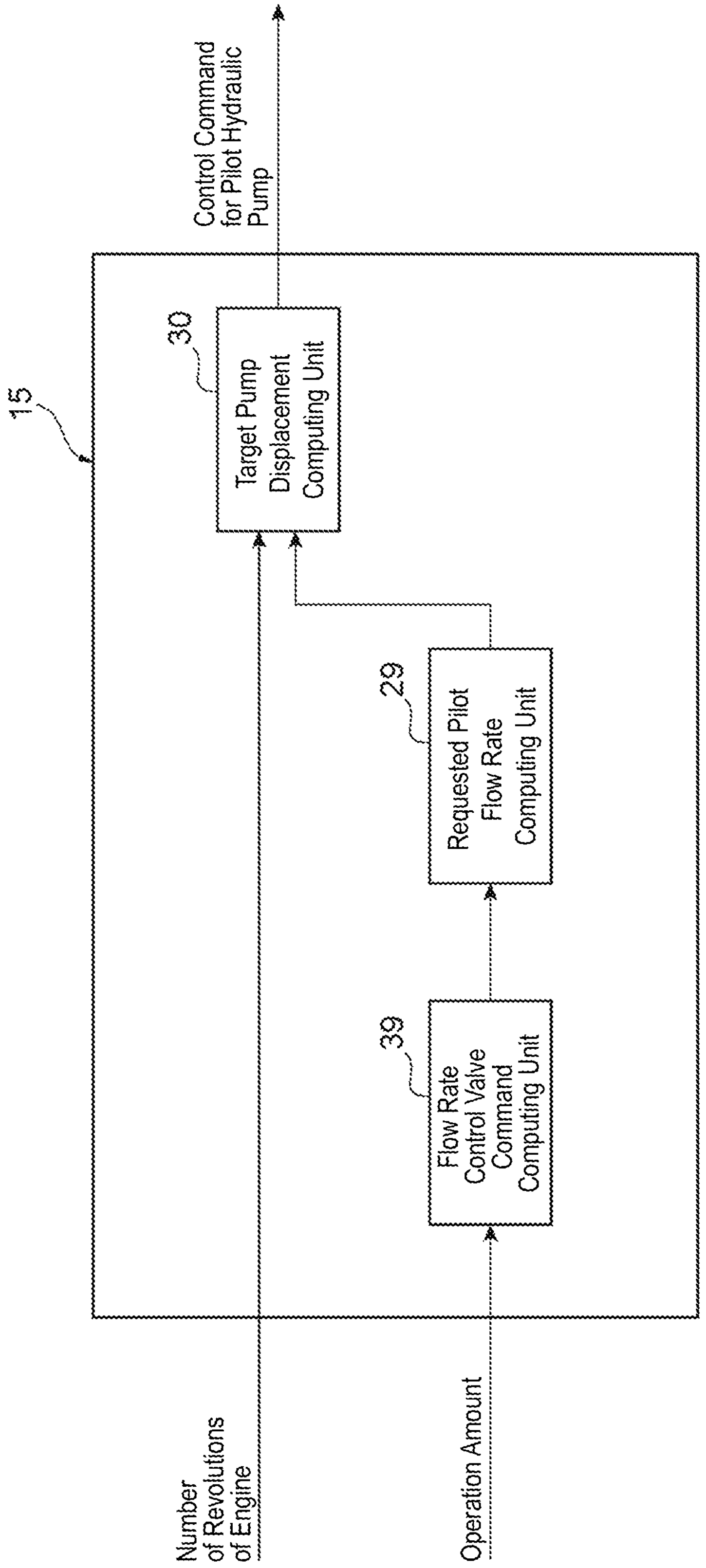
FIG. 5 is a block diagram illustrating a controller related to control of a pilot hydraulic pump.

FIG. 5 is a block diagram illustrating the controller related to the control of the pilot hydraulic pump. As illustrated in FIG. 5, the controller 15 includes a flow rate control valve command computing unit 39, a requested pilot flow rate computing unit 29, and a target pump displacement computing unit 30. The flow rate control valve command computing unit 39 computes a control command for each of the flow rate control valves 25*a* to 25*f* based on the operation amount output from each of the operating levers 22*a* to 22*f*, and outputs the computed control command. In the present embodiment, the operating device 14 includes hydraulic pilot levers. Therefore, in practice, a control command output to each of the flow rate control valves 25*a* to 25*f* is a pilot pressure generated by each pilot valve. The flow rate control valve command computing unit 39 estimates the actually generated pilot pressure based on the operation amount of the operating device 14.

The requested pilot flow rate computing unit 29 computes a requested pilot flow rate for the pilot hydraulic pump 18 from the control commands for the respective flow rate control valves 25*a* to 25*f*. That is, the requested pilot flow rate computing unit 29 obtains a requested pilot flow rate determined in accordance with the control commands for the respective flow rate control valves 25*a* to 25*f*. Meanwhile, the target pump displacement computing unit 30 computes the target pump displacement of the pilot hydraulic pump 18 by dividing the requested pilot flow rate output from the requested pilot flow rate computing unit 29 by the number of revolutions of the engine, and further outputs a control command for attaining the computed target pump displacement.

Figure 6:
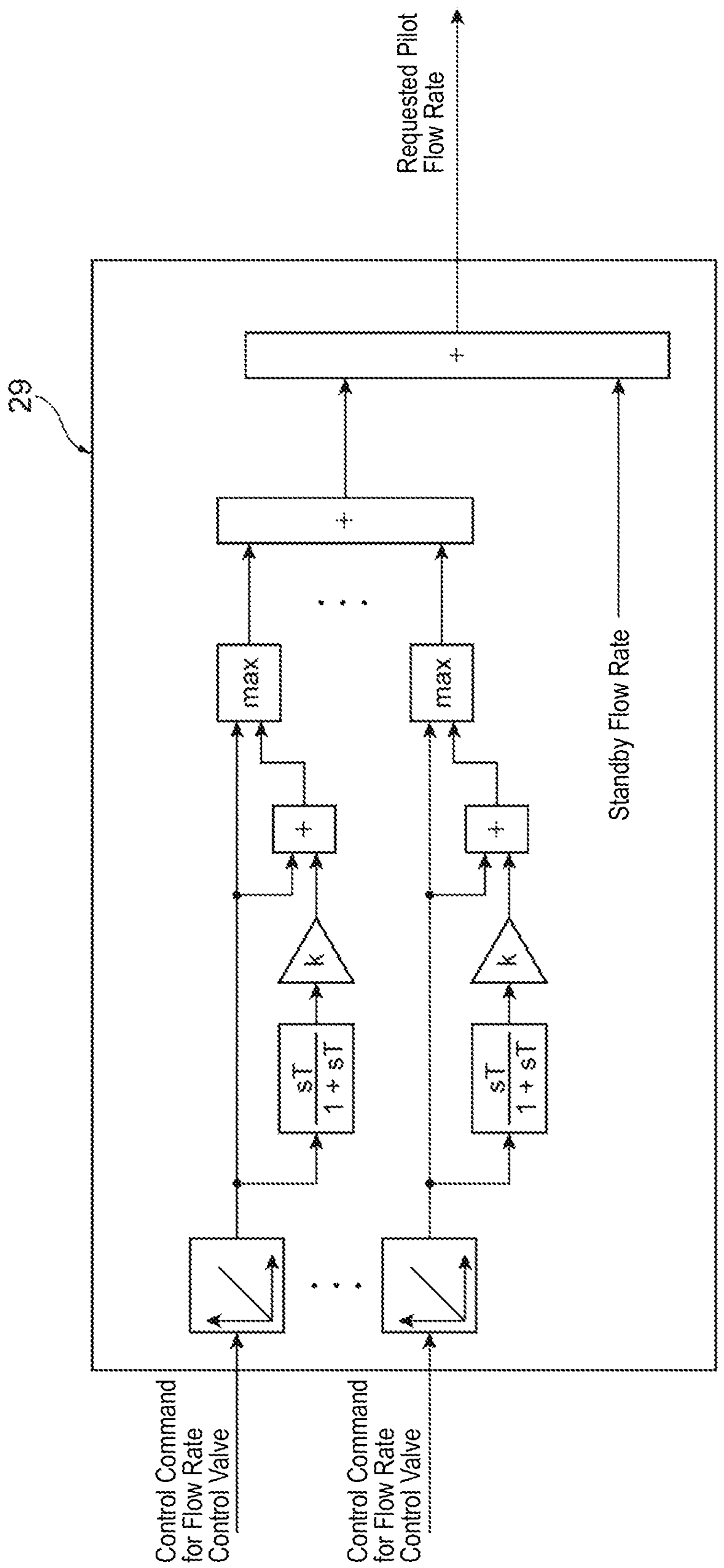
FIG. 6 is a diagram for illustrating computation of a requested pilot flow rate computing unit.

FIG. 6 is a diagram for illustrating computation of the requested pilot flow rate computing unit. As illustrated in FIG. 6, the requested pilot flow rate computing unit 29 computes a requested pilot flow rate for each of the flow rate control valves 25*a* to 25 from a control command for each of the flow rate control valves 25*a* to 25*f* based on a conversion table, and determines the sum of the value of the requested pilot flow rate and a value, which is obtained by passing the requested pilot flow rate through a high-pass filter and multiplying the filtered value by a constant number, thereby temporarily increasing the requested pilot flow rate only while each of the flow rate control valves 25*a* to 25*f* starts to move.

Then, the requested pilot flow rate computing unit 29 selects the maximum value between the requested pilot flow rate and the filtered value thereof, thereby preventing a filtering process from being applied when the requested pilot flow rate falls. After that, the requested pilot flow rate computing unit 29 determines the sum of the requested pilot flow rates of the flow rate control valves 25*a* to 25*f*, and then outputs the sum of the determined sum and a preset standby flow rate as a requested pilot flow rate of the pilot hydraulic pump.

Herein, the standby flow rate means a pilot flow rate consumed per flow rate control valve of the flow rate control valves 25*a* to 25*f* that control the flow rate of pressure oil to be supplied to the hydraulic actuators 11*a* to 11*f*, respectively. It should be noted that the hydraulic excavator 1 according to the present embodiment includes a plurality of hydraulic actuators (i.e., six hydraulic actuators 11*a* to 11*f*) as described above, and the standby flow rate is set for the hydraulic actuators 11*a* to 11*f* when they are sequentially driven in a time-series manner.

For example, when an operator moves the boom 8, the arm 9, and the bucket 10 in turn to load earth and sand on the hydraulic excavator, for example, the operator sequentially drives the hydraulic actuator (i.e., the boom cylinder) 11*a* for driving the boom 8, the hydraulic actuator (i.e., the arm cylinder) 11*b* for driving the arm 9, and the hydraulic actuator (i.e., the bucket cylinder) 11*c* for driving the bucket 10. At this time, a standby flow rate is set for each of the hydraulic actuators 11*a*, 11*b*, and 11*c* (see FIG. 8). The standby flow rate set for each of the hydraulic actuators 11*a*, 11*b*, and 11*c* may be either the same or different.

Meanwhile, when the traveling body 2 is moved forward or backward, the hydraulic actuator (i.e., the right-travel motor) 11*e* and the hydraulic actuator (i.e., the left travel motor) 11*f* are driven concurrently. At this time, one standby flow rate is set for the hydraulic actuators 11*e* and 11*f* that have received drive commands.

Figure 7:
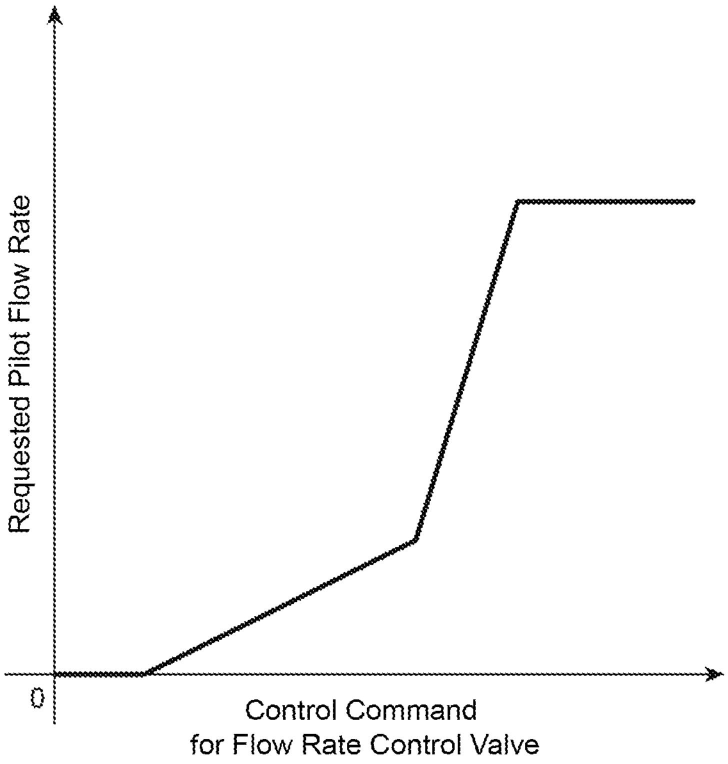
FIG. 7 is a graph illustrating the relationship between a control command for each flow rate control valve and a requested pilot flow rate.

FIG. 7 is a graph illustrating the relationship between a control command for each flow rate control valve and a requested pilot flow rate. As illustrated in FIG. 7, the requested pilot flow rate is set such that it monotonically increases with respect to the control command for each flow rate control valve. The relationship is determined by the properties of each hydraulic pilot lever and the properties of each flow rate control valve. The relationship may differ for each hydraulic actuator, and need not be a monotonical increase.

Figure 8:
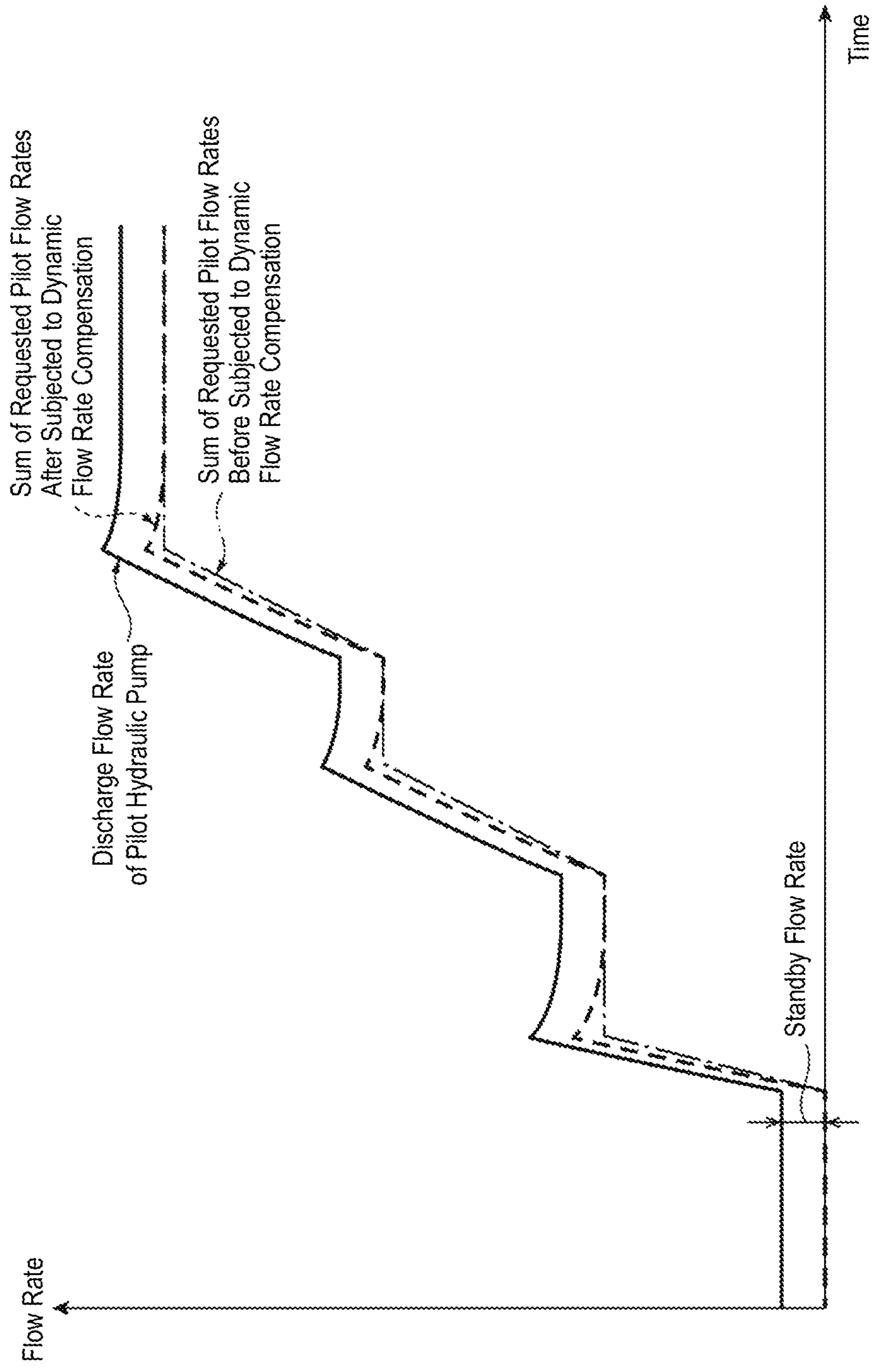
FIG. 8 is a graph illustrating a change in the discharge flow rate of the pilot hydraulic pump with time.

FIG. 8 is a graph illustrating a change in the discharge flow rate of the pilot hydraulic pump with time. In FIG. 8, the alternate long and short dash line indicates the sum of the requested pilot flow rates before subjected to dynamic flow rate compensation, the dashed line indicates the sum of the requested pilot flow rates after subjected to dynamic flow rate compensation, and the solid line indicates the discharge flow rate of the pilot hydraulic pump. In the example illustrated in FIG. 8, operator's work of sequentially driving the boom 8, the arm 9, and the bucket 10 to load earth and sand on the hydraulic excavator is supposed, for example.

As illustrated in FIG. 8, in the present embodiment, only while the flow rate control valves 25*a* to 25*f* start to move, the requested pilot flow rate is temporarily higher than the sum of the requested pilot flow rates corresponding to the control commands for the respective flow rate control valves 25*a* to 25*f* (i.e., the sum of the requested pilot flow rates before subjected to dynamic flow rate compensation as indicated by the alternate long and short dash line) due to the filtering process performed. Thus, a command for dynamic flow rate compensation is output (i.e., the sum of the requested pilot flow rates after subjected to dynamic flow rate compensation as indicated by the dashed line). In the present embodiment, a flow rate, which is obtained by adding a preset standby flow rate to the sum of the requested pilot flow rates after subjected to dynamic flow rate compensation, is output as the discharge flow rate of the pilot hydraulic pump (see the portion of the solid line).

That is, in the hydraulic excavator 1 according to the present embodiment, the controller 15 controls the discharge flow rate of the pilot hydraulic pump 18 such that it becomes equal to the sum of the requested pilot flow rates determined in accordance with the control commands for the respective flow rate control valves 25*a* to 25*f* and a preset standby flow rate. Therefore, since the pilot hydraulic pump 18 supplies a pilot flow rate that is higher than the pilot flow rate necessary for driving the hydraulic actuators 11*a* to 11*f* by the standby flow rate, it is possible to reduce the energy consumption of the pilot hydraulic pump 18, and prevent response delay of the hydraulic actuators 11*a* to 11*f* as well as temporal deceleration or stop of the hydraulic actuators 11*a* to 11*f*, which would otherwise occur due to an insufficient supply of the pilot flow rate, and thus maintain excellent operability.

Second Embodiment

Hereinafter, a second embodiment of a work machine will be described with reference to FIGS. 9 and 10. The hydraulic excavator of the present embodiment differs from that of the aforementioned first embodiment in that the pilot hydraulic pump is driven by an electric motor and in the structure of the controller. The other structures are similar to those of the first embodiment. Thus, overlapped description will be omitted.

Figure 9:
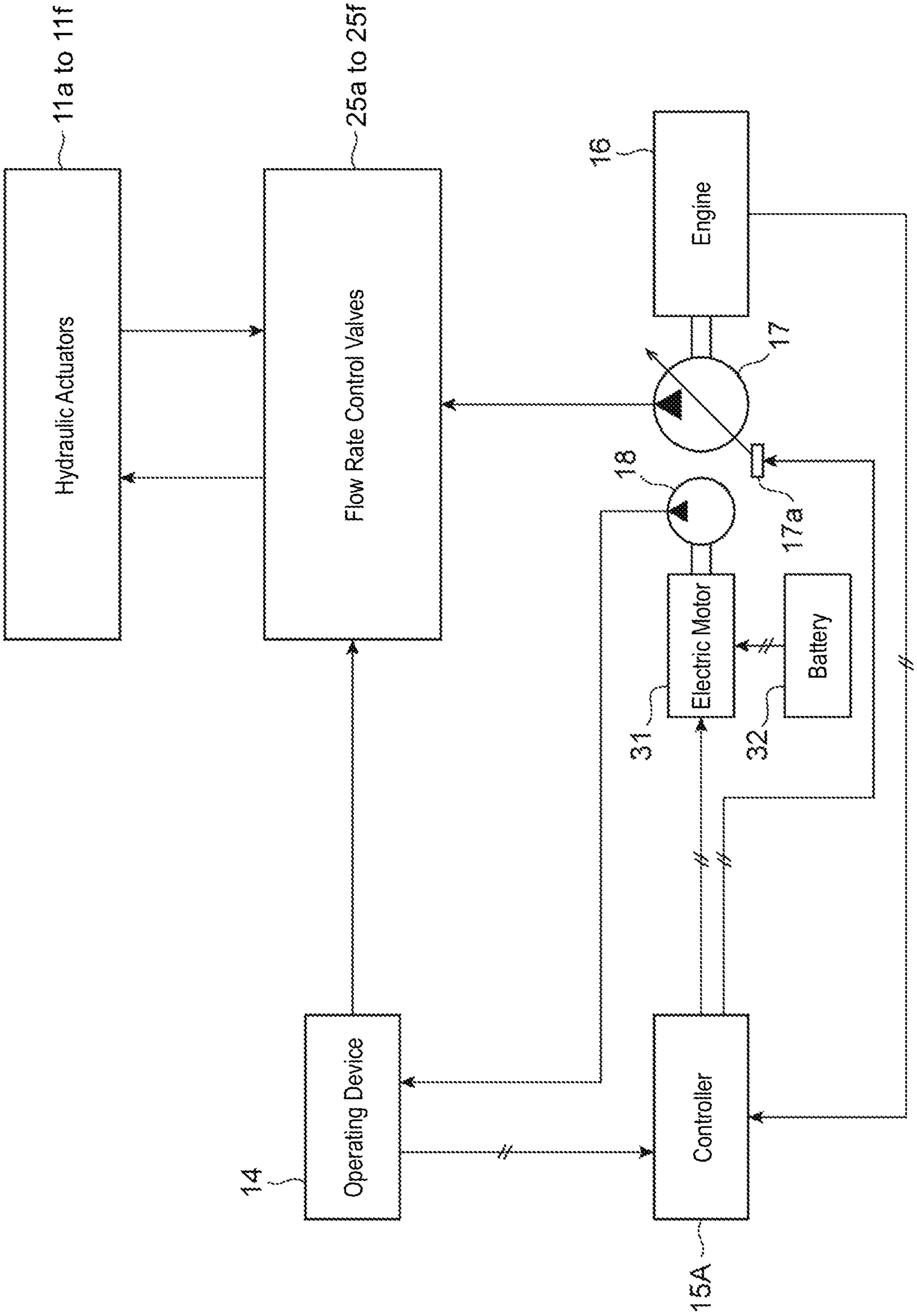
FIG. 9 is a configuration diagram illustrating a system of a hydraulic excavator according to a second embodiment.

FIG. 9 is a configuration diagram illustrating a system of a hydraulic excavator according to the second embodiment.

In the present embodiment, the pilot hydraulic pump 18 is a fixed displacement hydraulic pump driven by an electric motor 31. The electric motor 31 is driven by a battery 32, and the number of revolutions of the electric motor 31 is controlled in accordance with a control command from a controller 15A. The electric motor 31 and the battery 32 are disposed in the engine room 5, for example.

Figure 10:
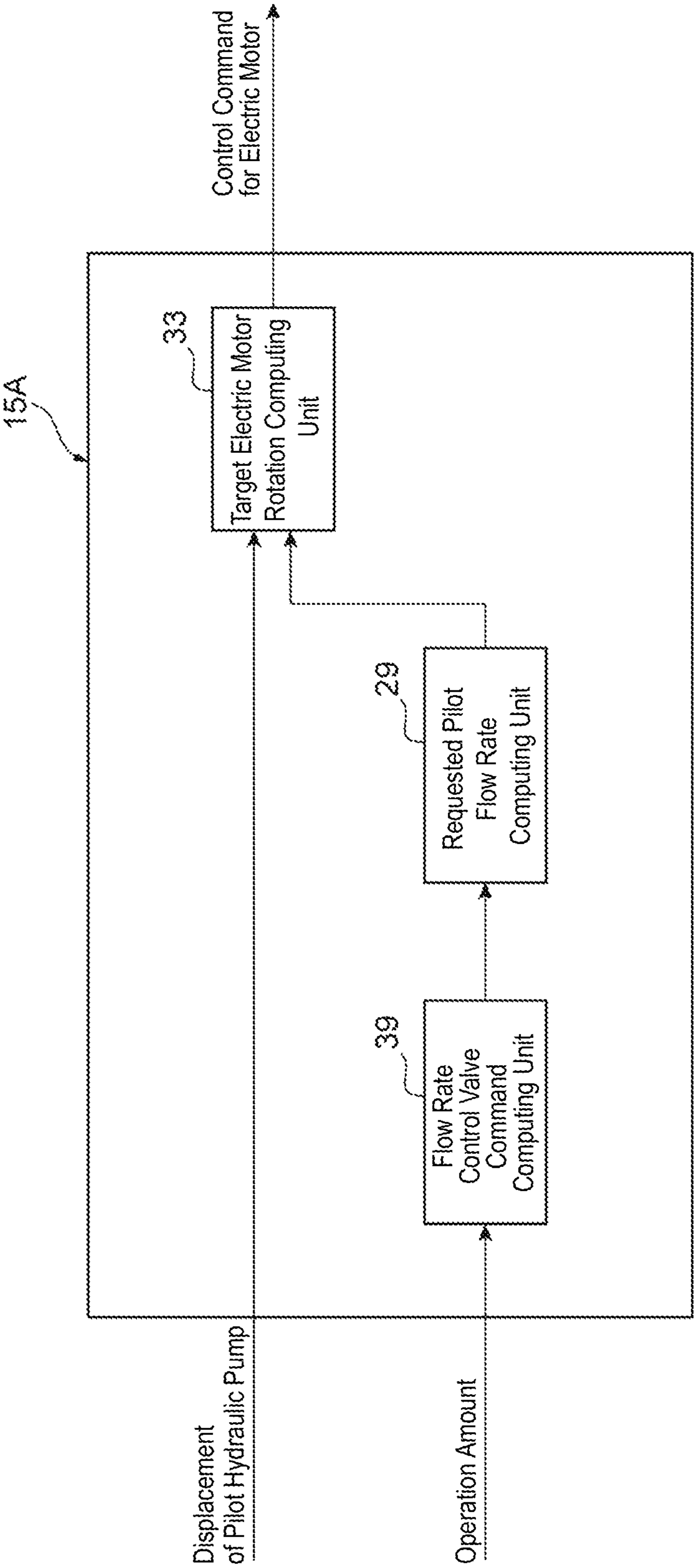
FIG. 10 is a block diagram illustrating a controller related to control of a pilot hydraulic pump.

FIG. 10 is a block diagram illustrating the controller related to the control of the pilot hydraulic pump. As illustrated in FIG. 10, the controller 15A includes the flow rate control valve command computing unit 39, the requested pilot flow rate computing unit 29, and a target electric motor rotation computing unit 33. The flow rate control valve command computing unit 39 and the requested pilot flow rate computing unit 29 are the same as those described in the first embodiment. Meanwhile, the target electric motor rotation computing unit 33 computes the target number of revolutions of the electric motor by dividing the requested pilot flow rate output from the requested pilot flow rate computing unit 29 by the pump displacement of the pilot hydraulic pump 18, and outputs a control command.

In addition, the controller 15A controls the discharge flow rate of the pilot hydraulic pump 18 such that it becomes equal to the sum of the requested pilot flow rates determined in accordance with the control commands for the respective flow rate control valves 25*a* to 25*f* and a standby flow rate as in the first embodiment.

With the hydraulic excavator according to the present embodiment, it is possible to reduce energy consumed by the pilot hydraulic pump and maintain excellent operability as in the aforementioned first embodiment.

Third Embodiment

Hereinafter, a third embodiment of a work machine will be described with reference to FIGS. 11 to 15. The hydraulic excavator of the present embodiment differs from that of the aforementioned first embodiment in that the operating device includes electric levers and the hydraulic excavator further includes a proportional solenoid valve. The other structures are similar to those of the first embodiment. Thus, overlapped description will be omitted.

Figure 11:
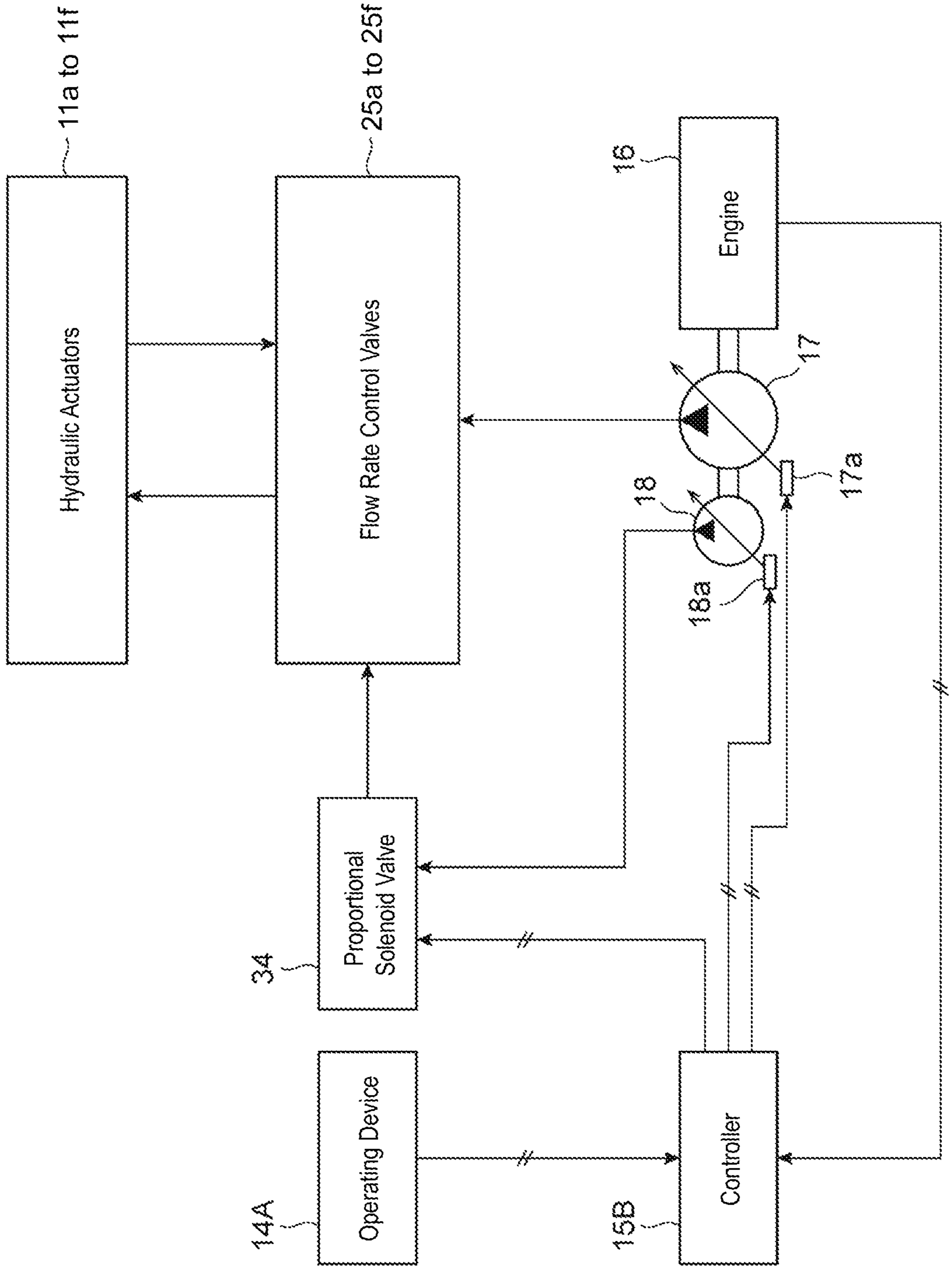
FIG. 11 is a configuration diagram illustrating a system of a hydraulic excavator according to a third embodiment.

FIG. 11 is a configuration diagram illustrating a system of the hydraulic excavator according to the third embodiment. An operating device 14A of the present embodiment includes electric levers including a boom operating lever, an arm operating lever, a bucket operating lever, a swivel operating lever, a right-travel operating lever, and a left-travel operating lever. The boom operating lever outputs a boom lowering operation amount and a boom raising operation amount to a controller 15B. The arm operating lever outputs an arm dump operation amount and an arm crowd operation amount to the controller 15B. The bucket operating lever outputs a bucket dump operation amount and a bucket crowd operation amount to the controller 15B. The swivel operating lever outputs a right-swivel operation amount and a left-swivel operation amount to the controller 15B. The right-travel operating lever outputs a right-travel forward movement operation amount and a right-travel backward movement operation amount to the controller 15B. The left-travel operating lever outputs a left-travel forward movement operation amount and a left-travel backward movement operation amount to the controller 15B.

The hydraulic excavator according to the present embodiment further includes a proportional solenoid valve (i.e., a pressure-reducing valve) 34. The proportional solenoid valve 34 is adapted to reduce the pressure of pressure oil supplied from the pilot hydraulic pump 18 based on a control command from the controller 15B, and generate a pilot pressure for driving each of the flow rate control valves 25*a* to 25*f*, and then output the pilot pressure to each of the flow rate control valves 25*a* to 25*f*.

Figure 12:
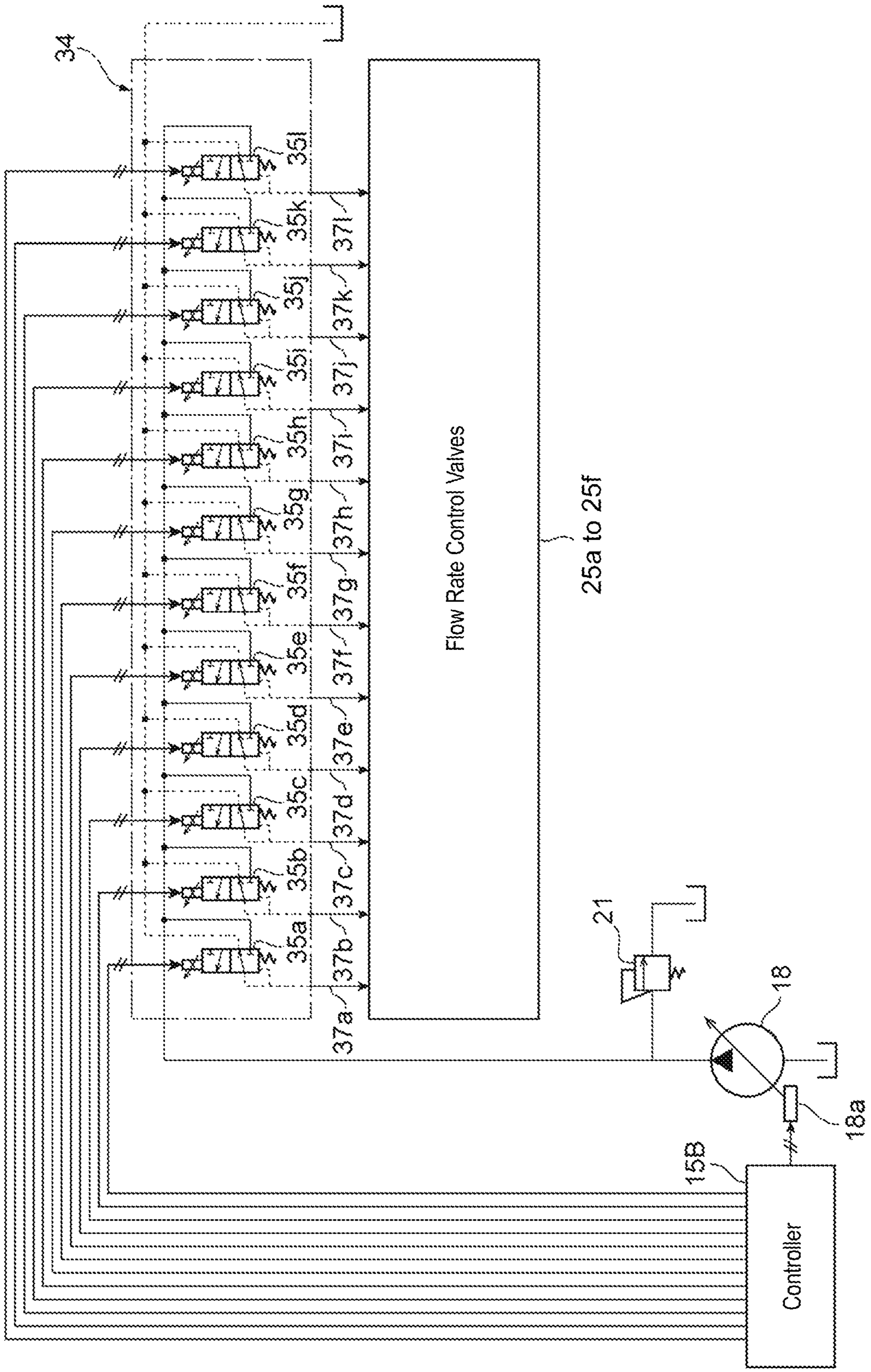
FIG. 12 is a diagram illustrating a hydraulic circuit of the hydraulic excavator according to the third embodiment.

FIG. 12 is a diagram illustrating a hydraulic circuit of the hydraulic excavator according to the third embodiment. As illustrated in FIG. 12, the proportional solenoid valve 34 includes a boom lowering proportional solenoid valve 35*a*, a boom raising proportional solenoid valve 35*b*, an arm dump proportional solenoid valve 35*c*, an arm crowd proportional solenoid valve 35*d*, a bucket dump proportional solenoid valve 35*e*, a bucket crowd proportional solenoid valve 35*f*, a right-swivel proportional solenoid valve 35*g*, a left-swivel proportional solenoid valve 35*h*, a right-travel forward movement proportional solenoid valve 35*i*, a right-travel backward movement proportional solenoid valve 35*j*, a left-travel forward movement proportional solenoid valve 35*k*, and a left-travel backward movement proportional solenoid valve 35*l*.

The boom lowering proportional solenoid valve 35*a* outputs a boom lowering control pilot pressure 37*a* to the boom flow rate control valve 25*a*, and the boom raising proportional solenoid valve 35*b* outputs a boom raising control pilot pressure 37*b* to the boom flow rate control valve 25*a*. The arm dump proportional solenoid valve 35*c* outputs an arm dump control pilot pressure 37*c* to the arm flow rate control valve 25*b*, and the arm crowd proportional solenoid valve 35*d* outputs an arm crowd control pilot pressure 37*d* to the arm flow rate control valve 25*b*. The bucket dump proportional solenoid valve 35*e* outputs a bucket dump control pilot pressure 37*e* to the bucket flow rate control valve 25*c*, and the bucket crowd proportional solenoid valve 35*f* outputs a bucket crowd control pilot pressure 37*f* to the bucket flow rate control valve 25*c*.

The right-swivel proportional solenoid valve 35*g* outputs a right-swivel control pilot pressure 37*g* to the swivel flow rate control valve 25*d*, and the left-swivel proportional solenoid valve 35*h* outputs a left-swivel control pilot pressure 37*h* to the swivel flow rate control valve 25*d*. The right-travel forward movement proportional solenoid valve 35*i* outputs a right-travel forward movement control pilot pressure 37*i* to the right-travel flow rate control valve 25*e*, and the right-travel backward movement proportional solenoid valve 35*j* outputs a right-travel backward movement control pilot pressure 37*j* to the right-travel flow rate control valve 25*e*. The left-travel forward movement proportional solenoid valve 35*k* outputs a left-travel forward movement control pilot pressure 37*k* to the left-travel flow rate control valve 25*f*, and the left-travel backward movement proportional solenoid valve 35*l* outputs a left-travel backward movement control pilot pressure 37*l* to the left-travel flow rate control valve 25*f*.

Figure 13:
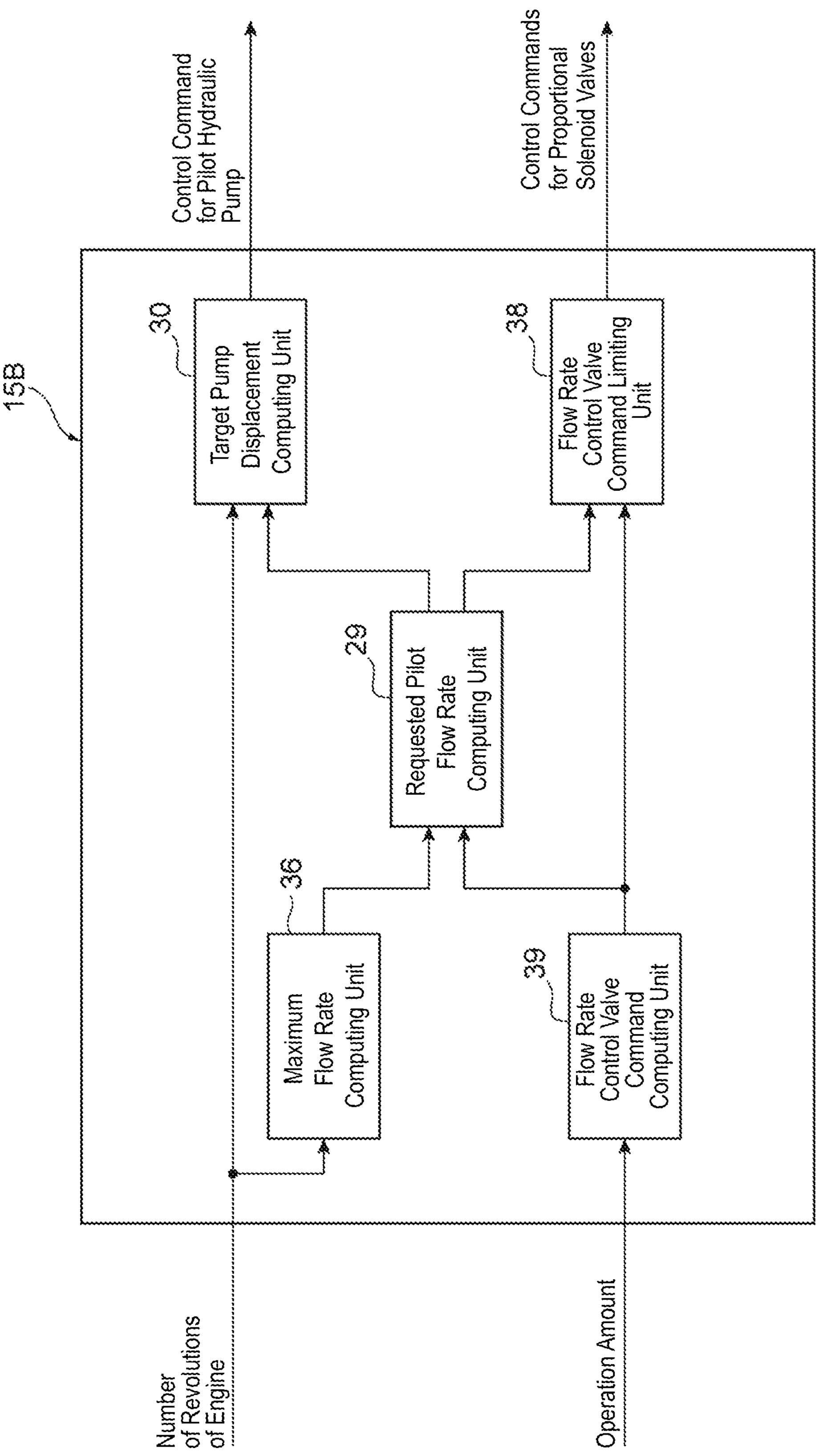
FIG. 13 is a block diagram illustrating a controller related to control of a pilot hydraulic pump.

FIG. 13 is a block diagram illustrating the controller related to the control of the pilot hydraulic pump. As illustrated in FIG. 13, the controller 15B includes a maximum flow rate computing unit 36, the flow rate control valve command computing unit 39, the requested pilot flow rate computing unit 29, the target pump displacement computing unit 30, and a flow rate control valve command limiting unit 38.

The maximum flow rate computing unit 36 computes the maximum flow rate of the pilot hydraulic pump 18 based on the number of revolutions of the engine and the maximum displacement of the pilot hydraulic pump 18, and outputs the computation result to the requested pilot flow rate computing unit 29. The flow rate control valve command computing unit 39 computes control commands for the respective flow rate control valves 25*a* to 25*f* in accordance with the operation amounts of the respective operating levers output from the operating device 14A, and outputs the computed control commands. The requested pilot flow rate computing unit 29 outputs the requested pilot flow rate of the pilot hydraulic pump 18 and 7 the limited control amounts for the respective control valves 25*a* to 25*f* based on the maximum flow rate of the pilot hydraulic pump 18 output from the maximum flow rate computing unit 36 and the flow rate control valve control commands output from the flow rate control valve command computing unit 39. It should be noted that the details of the requested pilot flow rate computing unit 29 will be described later.

The target pump displacement computing unit 30 computes the target displacement of the pilot hydraulic pump 18 based on the number of revolutions of the engine and the requested pilot flow rate output from the requested pilot flow rate computing unit 29, and outputs a control command to the pilot hydraulic pump 18.

The flow rate control valve command limiting unit 38 computes a control command for the proportional solenoid valve 34 based on the control amount for each of the flow rate control valves 25*a* to 25*f* output from the flow rate control valve command computing unit 39 and the limited control amount for each of the flow rate control valves 25*a* to 25*f* output from the requested pilot flow rate computing unit 29, and outputs the control command. Specifically, the flow rate control valve command limiting unit 38 selects the smaller one between the control amount for each of the flow rate control valves 25*a* to 25*f* output from the flow rate control valve command computing unit 39 and the limited control amount for each of the flow rate control valves 25*a* to 25*f* output from the requested pilot flow rate computing unit 29, and outputs a proportional solenoid valve command that is necessary for the control amount for each of the flow rate control valves 25*a* to 25*f*.

Figure 14:
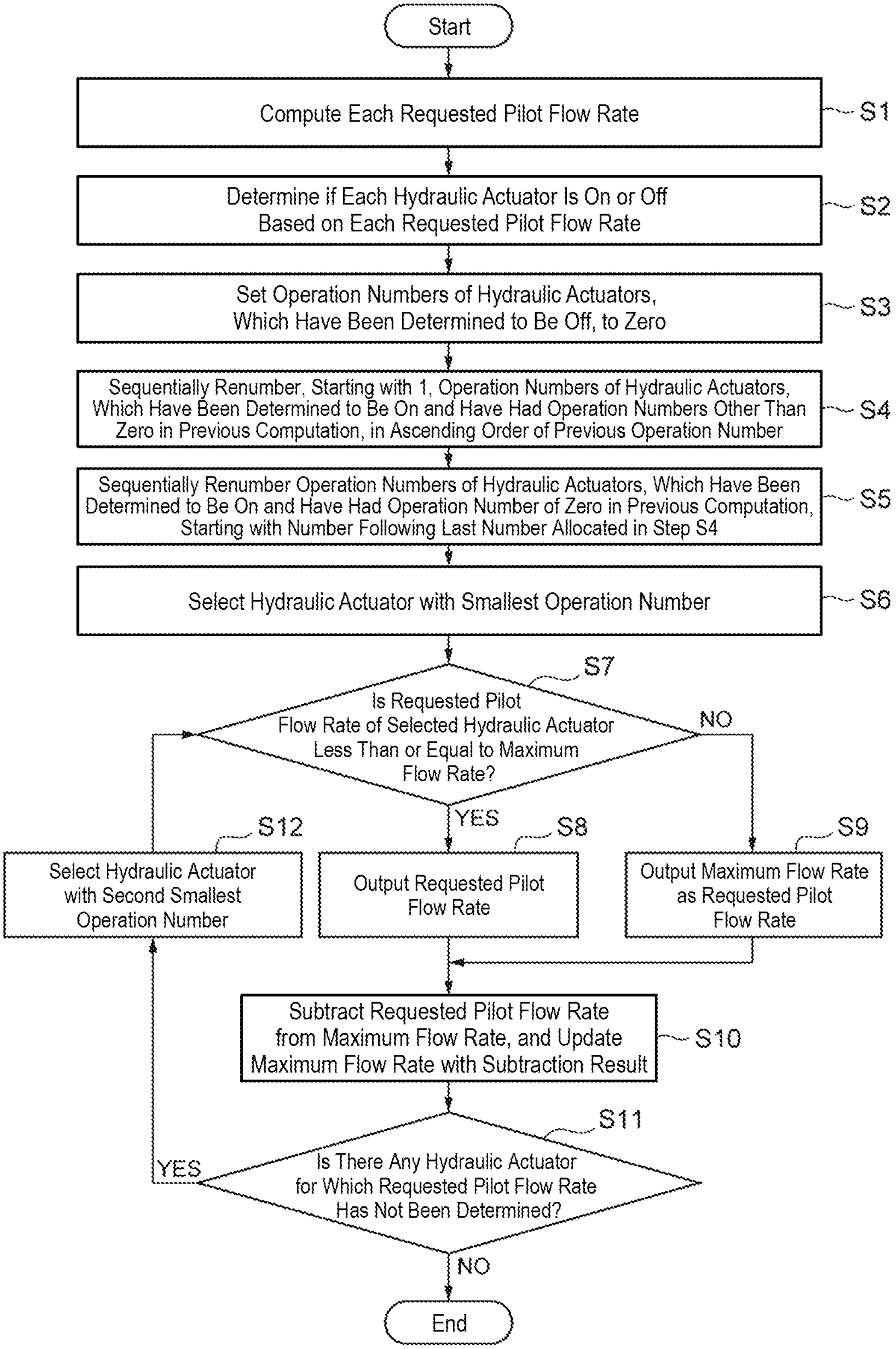
FIG. 14 is a flowchart illustrating a control process of a controller.

FIG. 14 is a flowchart illustrating a control process of the controller. First, in step S1, the requested pilot flow rate computing unit 29 computes a requested pilot flow rate to be consumed by each of the flow rate control valves 25*a* to 25*f* from a control command for each of the flow rate control valves 25*a* to 25*f* output from the flow rate control valve command computing unit 39. The method of computing the requested pilot flow rate from the control command for each of the flow rate control valves 25*a* to 25*f* is similar to that described in the first embodiment.

In step S2 following step S1, the controller 15B determines that the hydraulic actuators are ON if their requested pilot flow rates are greater than zero, and determines that the hydraulic actuators are OFF if their requested pilot flow rates are zero. In step S3 following step S2, the controller 15B sets the operation numbers allocated to the hydraulic actuators, which have been determined to be OFF, to zero.

In step S4 following step S3, the controller 15B sequentially renumbers, starting with 1, the operation numbers for the hydraulic actuators, which have been determined to be ON in the current operation and have had operation numbers other than zero in the previous computation, in ascending order of previous operation number. In step S5 following step S4, the controller 15B sequentially renumbers the operation numbers for the hydraulic actuators, which have been determined to be ON and have had an operation number of zero in the previous computation, starting with the number following the last number allocated in step S4.

In step S6 following step S5, if there is a plurality of hydraulic actuators that has been determined to be ON and has had an operation number of zero in the previous computation, the controller 15B allocates the operation numbers in accordance with a preset priority of the hydraulic actuators. Then, the controller 15B selects a hydraulic actuator with the smallest operation number among the allocated operation numbers.

In step S7 following step S6, the controller 15B determines if the requested pilot flow rate corresponding to the selected hydraulic actuator is less than or equal to the maximum flow rate of the pilot hydraulic pump output from the maximum flow rate computing unit 36. If the requested pilot flow rate of the selected hydraulic actuator is less than or equal to the maximum flow rate, the controller 15B outputs the requested pilot flow rate of the selected hydraulic actuator as it is (see step S8). Meanwhile, if the requested pilot flow rate of the selected hydraulic actuator is greater than the maximum flow rate, the controller 15B outputs the maximum flow rate as the requested pilot flow rate of the selected hydraulic actuator (see step S9).

In step S10 following step S8 or step S9, the controller 15B subtracts the output requested pilot flow rate from the maximum flow rate, and updates the maximum flow rate for use in the next computation with the subtraction result. In step S11 following step S10, the controller 15B determines if there is any hydraulic actuator for which a requested pilot flow rate has not been determined. If there is a hydraulic actuator for which a requested pilot flow rate has not been determined, the control process proceeds to step S12. In step S12, the controller 15B selects a hydraulic actuator with the second smallest operation number. After that, the control process proceeds to step S7 so that the aforementioned control process of from step S7 is repeated. Meanwhile, if it is determined that there is no hydraulic actuator for which a requested pilot flow rate has not been determined in step S11, the series of the control processes ends.

According to the aforementioned control process of the controller 15B, it is possible to compute the requested pilot flow rate for each of the hydraulic actuators 11*a* to 11*f* based on the control amount for each of the flow rate control valves 25*a* to 25*f*, and to, even if a plurality of hydraulic actuators is requesting a pilot flow rate at a time, limit a requested pilot flow rate of a hydraulic actuator that has received a drive command at a later timing.

In addition, the controller 15B outputs the sum of the requested pilot flow rates of the hydraulic actuators computed in accordance with the control flow and a preset standby flow rate as the requested pilot flow rate of the pilot hydraulic pump. Further, the controller 15B computes the limited control amount for each flow rate control valve by converting the computed requested pilot flow rate of each hydraulic actuator into the control amount for each flow rate control valve used in step S1 in terms of the requested pilot flow rate, and outputs the computed limited control amount.

Figure 15:
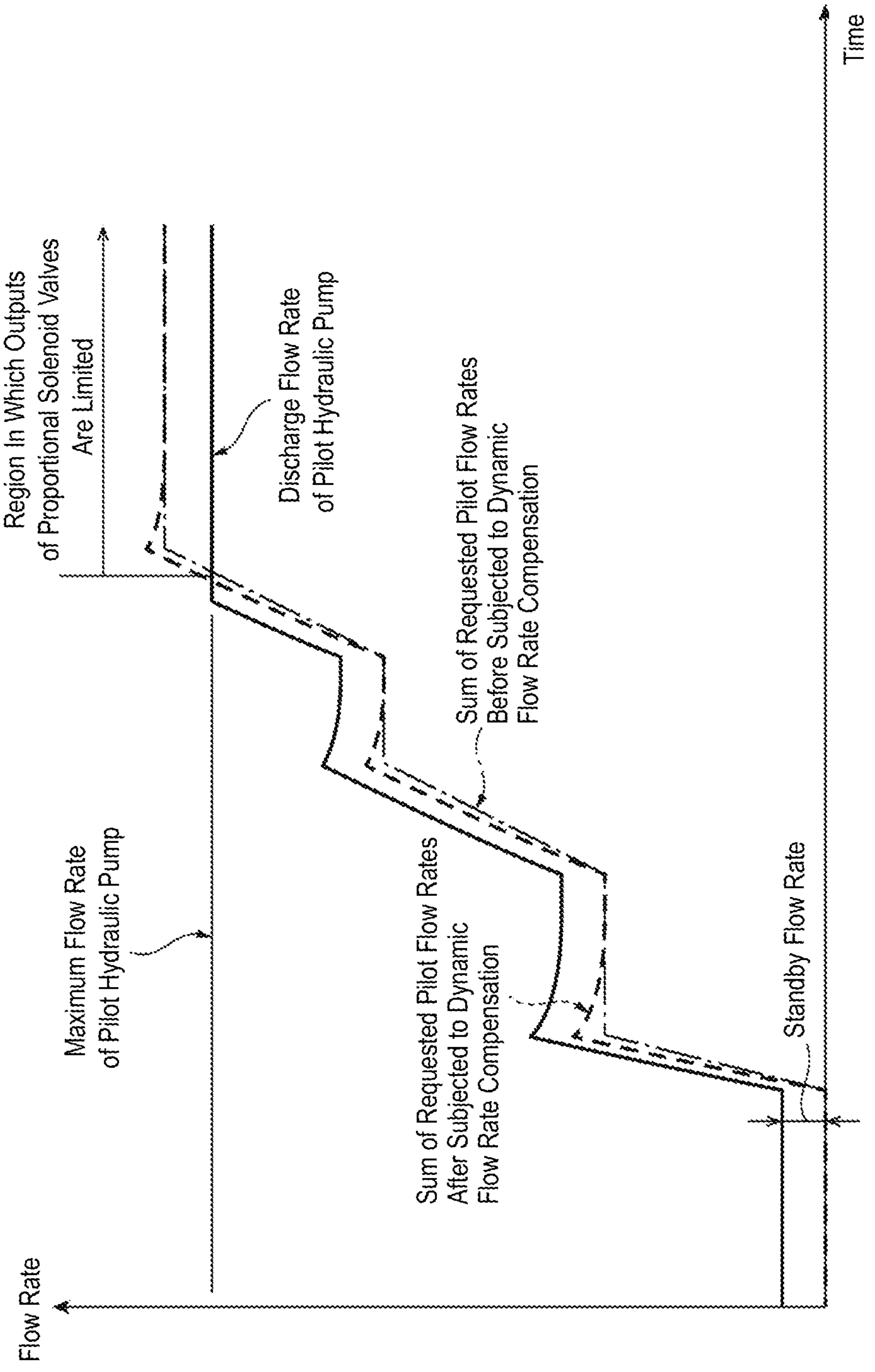
FIG. 15 is a graph illustrating a change in the discharge flow rate of the pilot hydraulic pump with time.

FIG. 15 is a graph illustrating a change in the discharge flow rate of the pilot hydraulic pump with time. The alternate long and short dash line, the dashed line, and the solid line in FIG. 15 indicate the same values as those in FIG. 8. As illustrated in FIG. 15, when the discharge flow rate of the pilot hydraulic pump is less than or equal to the maximum flow rate of the pilot hydraulic pump, the discharge flow rate is output such that it becomes equal to the sum of the requested pilot flow rates corresponding to the control amounts for the respective flow rate control valves (i.e., the requested pilot flow rates determined in accordance with the control commands for the respective flow rate control valves) and a standby flow rate. Meanwhile, when the discharge flow rate of the pilot hydraulic pump is over the maximum flow rate of the pilot hydraulic pump, the maximum flow rate of the pilot hydraulic pump is output as the discharge flow rate of the pilot hydraulic pump. In addition, when the sum of the requested pilot flow rates corresponding to the control amounts for the respective flow rate control valves is over the maximum flow rate of the pilot hydraulic pump, the sum of the pilot flow rates consumed by the respective flow rate control valves is limited such that it becomes equal to the maximum flow rate of the pilot hydraulic pump.

With the hydraulic excavator according to the present embodiment, it is possible to obtain the effects of reducing energy consumed by the pilot hydraulic pump and maintaining excellent operability as in the aforementioned first embodiment, and further obtain the following operational advantage. That is, when a plurality of hydraulic actuators is sequentially controlled, even if a pilot flow rate consumed by a proportional solenoid valve has exceeded the maximum flow rate of the pilot hydraulic pump, the outputs of the other proportional solenoid valves that have received control commands at later timings are limited, that is, the requested pilot flow rates of the hydraulic actuators that have received drive commands at later timings are limited. Thus, it is possible to prevent deceleration or stop of the hydraulic actuators, which would otherwise occur due to an insufficient supply of the pilot flow rate, and allow the hydraulic actuators, which have received drive commands so far, to continue operation.

That is, when a requested pilot flow rate that is necessary for driving a hydraulic actuator has exceeded the maximum flow rate of the pilot hydraulic pump, it is possible to, by limiting the outputs of the proportional solenoid valves other than the proportional solenoid valve that had been operating before the requested pilot flow rate has exceeded the maximum flow rate of the pilot hydraulic pump, prevent deceleration or stop of the hydraulic actuator that has been operating so far, and thus maintain excellent operability.

Fourth Embodiment

Hereinafter, a fourth embodiment of a work machine will be described with reference to FIGS. 16 and 17. The hydraulic excavator of the present embodiment differs from that of the aforementioned first embodiment in that the pilot hydraulic pump is driven by an electric motor and the hydraulic excavator further includes a proportional solenoid valve. The other structures are similar to those of the first embodiment. Thus, overlapped description will be omitted.

Figure 16:
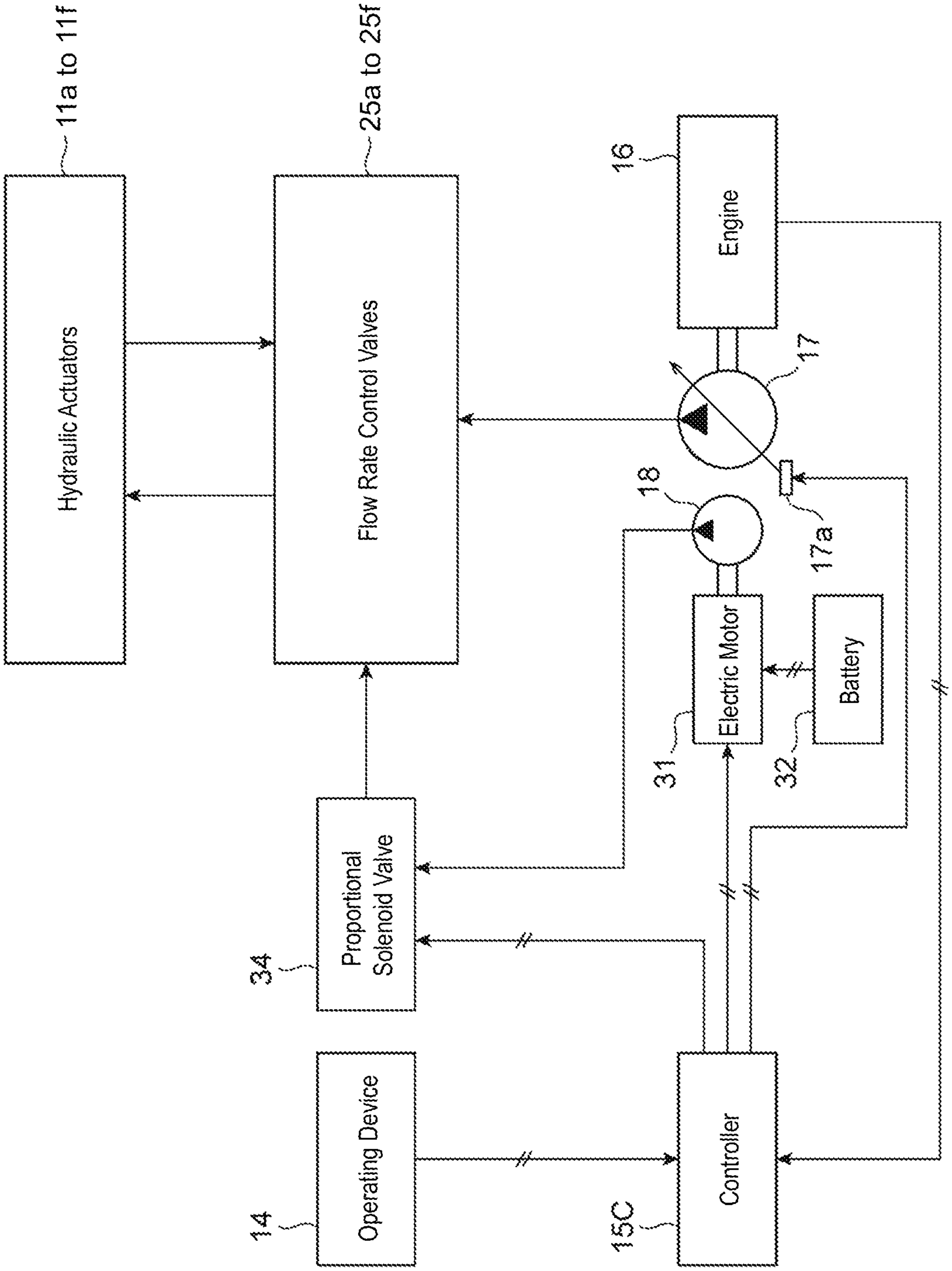
FIG. 16 is a configuration diagram illustrating a system of a hydraulic excavator according to a fourth embodiment.

FIG. 16 is a configuration diagram illustrating a system of the hydraulic excavator according to the fourth embodiment. In the present embodiment, the pilot hydraulic pump 18 is a fixed displacement hydraulic pump driven by the electric motor 31. The electric motor 31 is driven by the battery 32, and the number of revolutions of the electric motor 31 is controlled in accordance with a control command from a controller 15C. The electric motor 31 and the battery 32 are disposed in the engine room 5, for example.

The hydraulic excavator according to the present embodiment further includes the proportional solenoid valve 34. The proportional solenoid valve 34 is adapted to reduce the pressure of pressure oil supplied from the pilot hydraulic pump 18 based on a control command from the controller 15C, and generate a pilot pressure for driving each of the flow rate control valves 25*a* to 25*f*, and then output the pilot pressure to each of the flow rate control valves 25*a* to 25*f*.

It should be noted that the configuration of the proportional solenoid valve 34 is similar to that described in the third embodiment.

Figure 17:
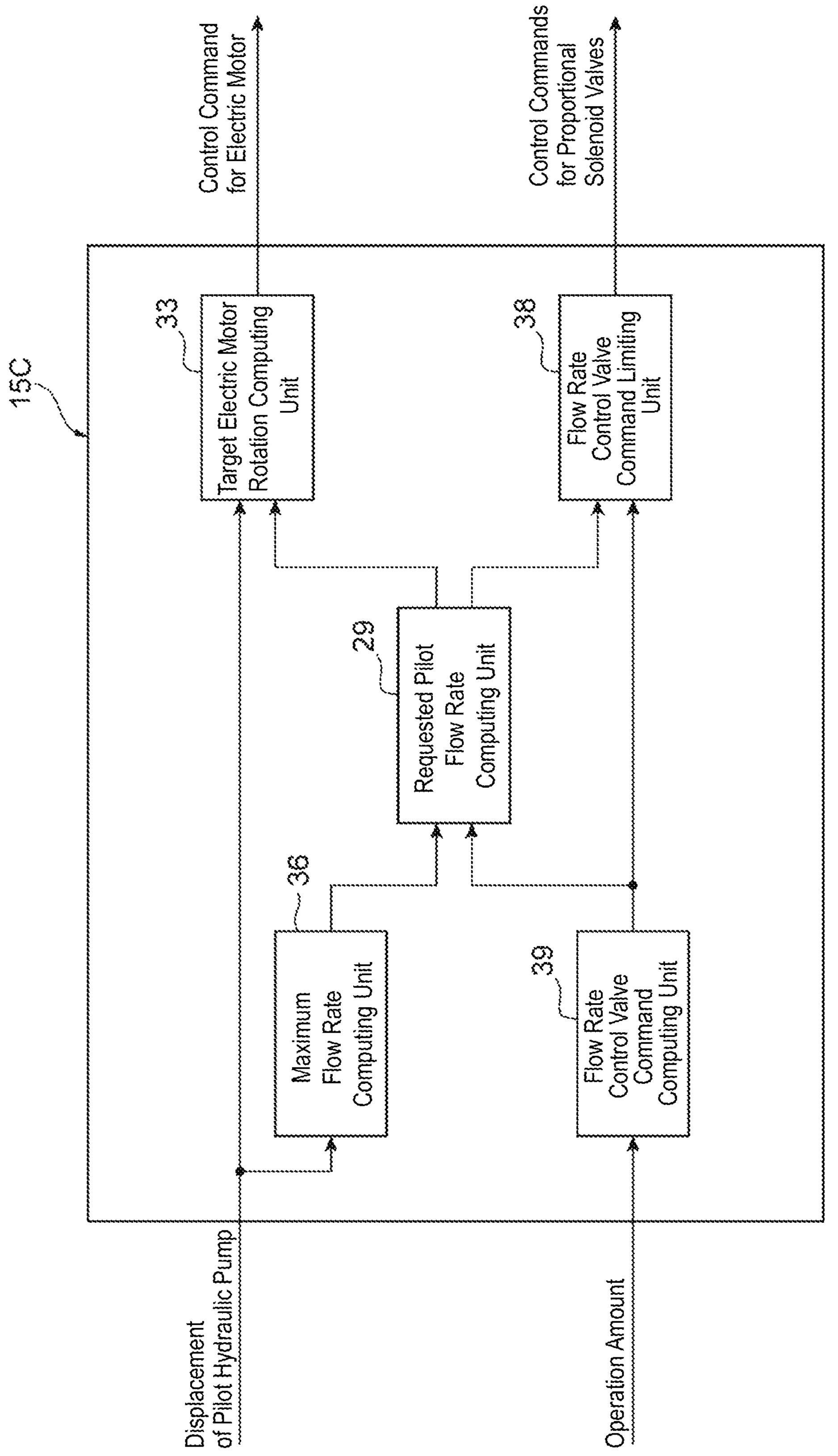
FIG. 17 is a block diagram illustrating a controller related to control of a pilot hydraulic pump.

FIG. 17 is a block diagram illustrating the controller related to the control of the pilot hydraulic pump. As illustrated in FIG. 17, the controller 15C includes the maximum flow rate computing unit 36, the flow rate control valve command computing unit 39, the requested pilot flow rate computing unit 29, the target electric motor rotation computing unit 33, and the flow rate control valve command limiting unit 38. The maximum flow rate computing unit 36 computes the maximum flow rate of the pilot hydraulic pump 18 from the displacement of the pilot hydraulic pump 18 and the maximum number of revolutions of the electric motor 31, and outputs the computed maximum flow rate.

The target electric motor rotation computing unit 33 computes the target number of revolutions of the electric motor 31 from the displacement of the pilot hydraulic pump 18 and the requested pilot flow rate of the pilot hydraulic pump 18 output from the requested pilot flow rate computing unit 29, and outputs a control command. The configurations of the requested pilot flow rate computing unit 29, the flow rate control valve command computing unit 39, and the flow rate control valve command limiting unit 38 are similar to those described in the third embodiment.

With the hydraulic excavator according to the present embodiment, it is possible to obtain the effects of reducing energy consumed by the pilot hydraulic pump and maintaining excellent operability as in the aforementioned first embodiment, and further obtain the following operational advantage. That is, when a plurality of hydraulic actuators is sequentially controlled, even if a pilot flow rate consumed by a proportional solenoid valve has exceeded the maximum flow rate of the pilot hydraulic pump, the outputs of the other proportional solenoid valves that have received control commands at later timings are limited. Thus, it is possible to prevent deceleration or stop of the hydraulic actuators, which would otherwise occur due to an insufficient supply of the pilot flow rate, and thus allow the hydraulic actuators, which have received drive commands so far, to continue operation.

Although the embodiments of the present invention have been described in detail above, the present invention is not limited thereto, and various design changes are possible within the spirit and scope of the present invention recited in the appended claims.

REFERENCE SIGNS LIST

1 Hydraulic excavator
2 Traveling body
3 Swivel body
4 Operator's cab
5 Engine room
6 Counterweight
7 Work machine
8 Boom
9 Arm
10 Bucket
11*a* to 11*f* Hydraulic actuators
14, 14A Operating devices
15, 15A, 15B, 15C Controllers
16 Engine (prime mover)
17 Main hydraulic pump
17*a*, 18*a* Regulators
18 Pilot hydraulic pump
25*a* to 25*f* Flow rate control valves

29 Requested pilot flow rate computing unit
30 Target pump displacement computing unit
31 Electric motor
33 Target electric motor rotation computing unit
34 Proportional solenoid valve (pressure-reducing valve)
36 Maximum flow rate computing unit
38 Flow rate control valve command limiting unit
39 Flow rate control valve command computing unit

The invention claimed is:

1. A work machine comprising:

a prime mover;

at least one main hydraulic pump driven by the prime mover;

a plurality of hydraulic actuators driven with pressure oil discharged from the main hydraulic pump;

a plurality of flow rate control valves adapted to control a flow rate of pressure oil to be supplied from the main hydraulic pump to the respective hydraulic actuators;

a pilot hydraulic pump adapted to supply pressure oil for driving the flow rate control valves; and a controller configured to control a discharge flow rate of the pilot hydraulic pump, wherein:

the controller is configured to control the discharge flow rate of the pilot hydraulic pump such that requested pilot flow rates determined in accordance with control commands for the respective flow rate control valves are subjected to a high-pass filtering process, thereby increasing the requested pilot flow rates only while the flow rate control valves start to move, and a preset standby flow rate is added to the requested pilot flow rates.

2. The work machine according to claim 1, further comprising:

a plurality of pressure-reducing valves adapted to reduce a pressure of pressure oil supplied from the pilot hydraulic pump and output control commands to the respective flow rate control valves, wherein:

the pressure-reducing valves are proportional solenoid valves controlled by the controller, and the controller is configured to, when the requested pilot flow rates have exceeded a maximum flow rate of the pilot hydraulic pump, limit outputs of the proportional solenoid valves.

3. The work machine according to claim 2, wherein the controller is configured to, when the requested pilot flow rates have exceeded the maximum flow rate of the pilot hydraulic pump, limit outputs of proportional solenoid valves other than a proportional solenoid valve that had been operating before the requested pilot flow rates have exceeded the maximum flow rate of the pilot hydraulic pump.

* * * * *